(12) United States Patent
Comeau et al.

(10) Patent No.: US 8,324,317 B2
(45) Date of Patent: *Dec. 4, 2012

(54) CATALYST COMPOSITIONS COMPRISING CHAIN SHUTTLING AGENTS AND THE USE THEREOF TO PRODUCE GOLF BALL COMPOSITIONS

(75) Inventors: Brian Comeau, Berkley, MA (US); David A. Bulpett, Boston, MA (US); Kevin M. Harris, New Bedford, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 161 days.

This patent is subject to a terminal disclaimer.

(21) Appl. No.: 12/819,320

(22) Filed: Jun. 21, 2010

(65) Prior Publication Data

US 2010/0255936 A1    Oct. 7, 2010

Related U.S. Application Data

(63) Continuation of application No. 11/610,315, filed on Dec. 13, 2006, now Pat. No. 7,741,407.

(51) Int. Cl.
*A63B 37/00* (2006.01)
*A63B 37/12* (2006.01)
*C08F 210/00* (2006.01)

(52) U.S. Cl. ......... 525/66; 525/74; 525/92 B; 525/92 C; 525/92 E; 525/92 F; 525/93; 525/184; 525/221; 525/285; 525/321; 525/323; 526/185; 526/348.2; 526/348.6; 473/373; 473/374

(58) Field of Classification Search .......... None
See application file for complete search history.

(56) References Cited

U.S. PATENT DOCUMENTS

| 6,663,507 B1 | 12/2003 | Watanabe et al. |
| 7,741,407 B2 * | 6/2010 | Comeau et al. ................. 525/66 |
| 2005/0075196 A1 | 4/2005 | Shimizu et al. |

FOREIGN PATENT DOCUMENTS

| WO | WO 2005/090425 | 9/2005 |
| WO | WO 2005/090426 | 9/2005 |
| WO | WO 2005/090427 | 9/2005 |

OTHER PUBLICATIONS

A. Hiltner, et al., "Solid State Structure Properties of Novel Olefin Block Copolymers", Dow Chemical Company, ANTEC, 2006, May 2006.
Arriola, Daniel J. et al., "Catalytic Production of Olefin Block Copolymers via Chain Shuttling Polymerization", Science Magazine, vol. 312, May 5, 2006.
Seema Karande et al., "Unique Material Properties and Potential Applications of Novel High Performance Olefin Elastomers", Dow Chemical Company, ANTEC 2006 Proceedings, May 2006.

* cited by examiner

*Primary Examiner* — David Buttner
(74) *Attorney, Agent, or Firm* — Mandi B. Milbank

(57) ABSTRACT

The present invention is directed to golf balls having at least one layer which comprises a polymer produced by a process wherein one or more monomers are contacted with a composition comprising the admixture or reaction product resulting from combining (A) a first olefin polymerization catalyst, (B) a second olefin polymerization catalyst capable of preparing polymers differing in chemical or physical properties from the polymer prepared by the first olefin polymerization catalyst under equivalent polymerization conditions, and (C) a chain shuttling agent. Golf balls of the present invention include one-piece, two-piece, and multi-layer golf balls. In two-piece and multi-layer golf balls of the present invention, the polymer may be present in a core layer, a cover layer, an intermediate layer (in the case of multi-layer balls), or a combination thereof.

15 Claims, No Drawings

CATALYST COMPOSITIONS COMPRISING CHAIN SHUTTLING AGENTS AND THE USE THEREOF TO PRODUCE GOLF BALL COMPOSITIONS

CROSS-REFERENCE TO RELATED APPLICATIONS

This application is a continuation of U.S. application Ser. No. 11/610,315, filed on Dec. 13, 2006 now U.S. Pat. No. 7,741,407, the entire disclosure of which is hereby incorporated herein by reference.

FIELD OF THE INVENTION

The present invention relates to multi-block copolymers prepared using catalyst compositions comprising chain shuttling agents, and to the use of such multi-block copolymers in golf ball compositions.

BACKGROUND OF THE INVENTION

Block copolymers, such as styrene-butadiene and styrene-butadiene-styrene, are known to be useful in golf ball compositions. Conventional block copolymers, however, contain unsaturated butadiene, and are thus not UV-stable unless the butadiene is hydrogenated to produce a more light stable polymer, such as styrene-ethylene-butylene-styrene.

Metallocene-catalyzed polymers are also known to be useful in golf ball compositions. Conventional metallocene polymers, however, generally have a narrow molecular weight distribution, which can lead to inferior processability in golf ball applications compared to polymers having a broad molecular weight distribution. Conventional metallocene polymers also tend to have poor heat resistance and reduced crystallinity.

Thus, there is a desire in the golf ball industry for novel polymers having a balance of desirable properties, such as light stability, heat resistance, and flexibility. The present invention describes such polymers and their use in a variety of golf ball core, cover, and intermediate layer compositions.

SUMMARY OF THE INVENTION

In one embodiment, the present invention is directed to a golf ball having at least one layer formed from a composition comprising a multi-block copolymer, wherein the multi-block copolymer is produced by a process comprising contacting ethylene under addition polymerization conditions with a catalyst composition. The catalyst composition comprises the admixture or reaction product resulting from combining (A) a first olefin polymerization catalyst, (B) a second olefin polymerization catalyst capable of preparing polymers differing in chemical or physical properties from the polymer prepared by the first olefin polymerization catalyst under equivalent polymerization conditions, and (C) a chain shuttling agent. At least one of the first or second polymerization catalyst is capable of forming a branched polymer by means of chain walking or reincorporation of in situ formed olefinic polymer chains.

In another embodiment, the present invention is directed to a golf ball having at least one layer formed from a composition comprising a multi-block copolymer, wherein the multi-block copolymer is produced by a process comprising contacting a first monomer selected from propylene and 4-methyl-1-pentene, and one or more addition polymerizable comonomers other than the first monomer, under addition polymerization conditions with a catalyst composition. The catalyst composition comprises the admixture or reaction product resulting from combining (A) a first olefin polymerization catalyst, (B) a second olefin polymerization catalyst capable of preparing polymers differing in chemical or physical properties from the polymer prepared by the first olefin polymerization catalyst under equivalent polymerization conditions, and (C) a chain shuttling agent.

In another embodiment, the present invention is directed to a golf ball having at least one layer formed from a composition comprising a multi-block copolymer, wherein the multi-block copolymer is produced by a process comprising contacting one or more addition polymerizable monomers under addition polymerization conditions with a catalyst composition. The catalyst composition comprises the admixture or reaction product resulting from combining (A) a first olefin polymerization catalyst, (B) a second olefin polymerization catalyst capable of preparing polymers differing in chemical or physical properties from the polymer prepared by the first olefin polymerization catalyst under equivalent polymerization conditions, and (C) a chain shuttling agent.

DETAILED DESCRIPTION OF THE INVENTION

Golf balls of the present invention include one-piece, two-piece (i.e., a core and a cover), multi-layer (i.e., a core of one or more layers and a cover of one or more layers), and wound golf balls, having a variety of core structures, intermediate layers, covers, and coatings. Golf ball cores may consist of a single, unitary layer, comprising the entire core from the center of the core to its outer periphery, or they may consist of a center surrounded by at least one outer core layer. The center, innermost portion of the core may be solid, hollow, or liquid-, gel-, or gas-filled. The outer core layer may be solid, or it may be a wound layer formed of a tensioned elastomeric material. Golf ball covers may also contain one or more layers, such as a double cover having an inner and outer cover layer. Additional layers may optionally be disposed between the core and cover. In the golf balls of the present invention, at least one layer is formed from a composition comprising a multi-block copolymer, wherein the multi-block copolymer is prepared in the presence of a chain shuttling agent.

For purposes of the present disclosure, "multi-block copolymer" refers to a polymer comprising two or more chemically, morphologically, or structurally distinct regions or segments (referred to as "blocks") preferably joined in a linear manner, that is, a polymer comprising differentiated units which are joined end-to-end with respect to polymerized ethylenic functionality, rather than in pendent or grafted fashion. In a particular embodiment, the blocks differ in the density, the amount of crystallinity, the crystallite size attributable to a polymer of such composition, the amount of chain branching, the homogeneity, or any other chemical or physical property attributable to an olefin polymer. In another particular embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyperbranching, the homogeneity, or any other chemical or physical property. In another particular embodiment, the copolymers are characterized by unique distributions of both polymer polydispersity ($M_w/M_n$), block length distribution, and/or block number distributions. Preferably, when produced in a continuous process, the copolymers have a polydispersity of from 1.7 to 2.9, more preferably from 1.8 to 2.5, and most preferably from 1.8 to 2.1. When produced in a batch or semi-batch process, the copolymers preferably have a polydispersity of from 1.0 to 2.9, more preferably from 1.3 to 2.5, and most preferably from 1.4 to 1.8.

The term "ethylene multi-block copolymer" means a multi-block copolymer comprising ethylene and optionally one or more copolymerizable comonomers, wherein ethylene comprises a plurality of the polymerized monomer units of at least one block or segment in the polymer, preferably at least 90 mole percent, more preferably at least 95 mole percent, and most preferably at least 98 mole percent of said block. Based on total polymer weight, the ethylene multi-block copolymers of the present invention preferably have an ethylene content from 25 to 97 percent, more preferably from 40 to 96 percent, even more preferably from 55 to 95 percent, and most preferably from 65 to 85 percent.

The term "comonomer incorporation index" refers to the percent comonomer incorporated into a copolymer prepared under representative ethylene/comonomer polymerization conditions by the catalyst under consideration in the absence of other polymerization catalysts, ideally under steady-state, continuous solution polymerization conditions in a hydrocarbon diluent at 100° C., 4.5 MPa ethylene pressure (reactor pressure), greater than 92 (more preferably greater than 95) percent ethylene conversion, and greater than 0.01 percent comonomer conversion. The selection of metal complexes or catalyst compositions having the greatest difference in comonomer incorporation indices results in copolymers from two or more monomers having the largest difference in block or segment properties, such as density.

In certain circumstances the comonomer incorporation index may be determined directly, for example by the use of NMR spectroscopic techniques. Often, however, any difference in comonomer incorporation must by indirectly determined. For polymers formed from multiple monomers this may be accomplished by various techniques based on monomer reactivities.

Comonomer incorporation index and methods for determining relative amounts of comonomer and monomer in the copolymer are further disclosed, for example, in PCT Publication Nos. WO2005/090425, WO2005/090426, and WO2005/090427, the entire disclosures of which are hereby incorporated herein by reference.

Monomers

In one embodiment, the copolymer is produced by the polymerization of a single monomer, ethylene.

In another embodiment, the copolymer is produced by the polymerization of an addition polymerizable monomer mixture predominantly comprised of propylene, 4-methyl-1-pentene, styrene, or another $C_4$-$C_{20}$ α-olefin with ethylene and/or one or more different addition polymerizable comonomers, especially ethylene and/or one or more $C_4$-$C_{20}$ α-olefins, cyclo-olefins or diolefins, to form a high molecular weight multi-block copolymer. Examples of suitable comonomers include ethylene and straight-chain or branched $C_4$-$C_{30}$ α-olefins (e.g., 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene), $C_3$-$C_{30}$ cycloolefins (e.g., cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene), di- and poly-olefins (e.g., butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, cyclo-hexadiene, butylidene norbornene, 7-methyl-1,6-octadiene, 4-ethylidene-8-methyl-1,7-nonadiene, and 5,9-dimethyl-1,4,8-decatriene), aromatic vinyl compounds (e.g., mono or poly alkylstyrenes including styrene, o-methylstyrene, m-methylstyrene, p-methylstyrene, o,p-dimethylstyrene, o-ethylstyrene, m-ethylstyrene, and p-ethylstyrene), and functional group-containing derivatives thereof (e.g., methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, α-methylstyrene, vinylchloride, 1,2-difluoroethylene, 1,2-dichloroethylene, tetrafluoroethylene, and 3,3,3-trifluoro-1-propene).

In another embodiment, the copolymer is produced by the polymerization of ethylene and one or more copolymerizable comonomers. Examples of suitable comonomers include straight-chain or branched $C_3$-$C_{30}$ α-olefins (e.g., propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene), and especially $C_4$-$C_{20}$ α-olefins; $C_3$-$C_{30}$ cycloolefins, such as those listed above; di- and poly-olefins, such as those listed above; aromatic vinyl compounds, such as those listed above; and functional group-containing derivatives thereof, such as those listed above.

Suitable monomers and comonomers are further disclosed in PCT Publication Nos. WO2005/090425, WO2005/090426, and WO2005/090427, the entire disclosures of which are hereby incorporated herein by reference.

Chain Shuttling Agents

For purposes of the present disclosure, "shuttling agent" refers to a compound or mixture of compounds employed in catalyst compositions of the present invention that is capable of causing polymeryl exchange between at least two active catalyst sites of the catalysts included in the catalyst compositions under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. Preferably, the shuttling agent has an activity ratio $R_{A-B}/R_{B-A}$ of from 0.01 to 100, more preferably from 0.1 to 10, more preferably from 0.5 to 2.0, and most preferably from 0.8 to 1.2, wherein $R_{A-B}$ is the rate of polymeryl transfer from catalyst A active site to catalyst B active site via the shuttling agent, and $R_{B-A}$ is the rate of reverse polymeryl transfer, i.e., the rate of exchange starting from catalyst B active site to catalyst A active site via the shuttling agent. Preferably, the intermediate formed between the shuttling agent and the polymeryl chain is sufficiently stable that chain termination is relatively rare. Preferably, less than 90 percent, more preferably less than 75 percent, more preferably less than 50 percent, and most preferably less than 10 percent, of shuttle-polymeryl products are terminated prior to attaining 3 distinguishable polymer segments or blocks. Ideally, the rate of chain shuttling (defined by the time required to transfer a polymer chain from a catalyst site to the chain shuttling agent and then back to a catalyst site) is equivalent to or faster than the rate of polymer termination, even up to 10 or even 100 times faster than the rate of polymer termination. This permits polymer block formation on the same time scale as polymer propagation.

By selecting different combinations of catalysts having differing branching indices and/or differing comonomer incorporation rates, as well as differing reactivities, and by pairing various shuttling agents or mixtures of agents with these catalyst combinations, polymer products can be prepared having segments of different densities or branching indices and/or comonomer concentrations, different block lengths, and different numbers of such segments or blocks in each copolymer. For example, if the activity of the shuttling agent is low relative to the catalyst polymer chain propagation rate of one or more of the catalysts, longer block length multi-block copolymers and polymer blends may be obtained. Contrariwise, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various ethylene polymers can be obtained.

In one embodiment, a suitable composition comprising Catalyst A, Catalyst B, and a chain shuttling agent can be selected by the following multi-step procedure specially adapted for block differentiation based on branching index:

I. Ethylene is polymerized using a mixture comprising a potential catalyst and a potential chain shuttling agent. This polymerization test is preferably performed using a batch or semi-batch reactor (that is, without resupply of catalyst or shuttling agent), preferably with relatively constant ethylene concentration, operating under solution polymerization conditions, typically using a molar ratio of catalyst to chain shuttling agent of from 1:5 to 1:500. After forming a suitable quantity of polymer, the reaction is terminated by addition of a catalyst poison and the polymer's properties (branching index, $M_w$, $M_n$, and $M_w/M_n$) are measured.

II. The foregoing polymerization and polymer testing are repeated for several different reaction times, providing a series of polymers having a range of yields and polydispersity values.

III. Catalyst/shuttling agent pairs demonstrating significant polymer transfer both to and from the shuttling agent are characterized by a polymer series wherein the minimum polydispersity is less than 2.0, preferably less than 1.5, and more preferably less than 1.3. Furthermore, if chain shuttling is occurring, the $M_n$ of the polymer will increase, preferably nearly linearly, as conversion is increased. Preferred catalyst/shuttling agent pairs are those giving polymer $M_n$ as a function of conversion (or polymer yield) fitting a line with a statistical precision of greater than 0.95, preferably greater than 0.99.

Steps I-III are then carried out for one or more additional pairing of potential catalysts and/or putative shuttling agents.

A suitable composition comprising Catalyst A, Catalyst B, and one or more chain shuttling agents is then selected such that the two catalysts each undergo chain shuttling with one or more of the chain shuttling agents, and one of the catalysts (designated as Catalyst B), forms polymer having a higher branching index compared to Catalyst A under the reaction conditions chosen. Preferably, at least one of the chain shuttling agents undergoes polymer transfer in both the forward and reverse directions (as identified in the foregoing test) with both Catalyst A and Catalyst B. In addition, the chain shuttling agent preferably does not reduce the catalyst activity (measured in weight of polymer produced per weight of catalyst per unit time) of either catalyst (compared to activity in the absence of a shuttling agent) by more than 60 percent. More preferably, such catalyst activity is not reduced by more than 20 percent. Most preferably, the catalyst activity of at least one of the catalysts is increased compared to the catalyst activity in the absence of a shuttling agent.

Alternatively, suitable catalyst/shuttling agent pairs can be detected by performing a series of ethylene polymerizations under standard batch reaction conditions and measuring the resulting $M_n$, polydispersity, branching index, and polymer yield or production rate. Suitable shuttling agents are characterized by lowering of the resultant $M_n$ without significant broadening of the polydispersity or loss of activity (reduction in yield or rate).

In another embodiment, a suitable composition comprising Catalyst A, Catalyst B, and a chain shuttling agent can be selected by the following multi-step procedure specially adapted for block differentiation based on comonomer incorporation:

I. One or more addition polymerizable monomers, preferably olefin monomers, are polymerized using a mixture comprising a potential catalyst and a potential chain shuttling agent. This polymerization test is preferably performed using a batch or semi-batch reactor, preferably with relatively constant monomer concentration, operating under solution polymerization conditions, typically using a molar ratio of catalyst to chain shuttling agent of from 1:5 to 1:500. After forming a suitable quantity of polymer, the reaction is terminated by addition of a catalyst poison and the polymer's properties ($M_w$, $M_n$, and $M_w/M_n$) are measured.

II. The foregoing polymerization and polymer testing are repeated for several different reaction times, providing a series of polymers having a range of yields and polydispersity values.

III. Catalyst/shuttling agent pairs demonstrating significant polymer transfer both to and from the shuttling agent are characterized by a polymer series wherein the minimum polydispersity is less than 2.0, preferably less than 1.5, and more preferably less than 1.3. Furthermore, if chain shuttling is occurring, the $M_n$ of the polymer will increase, preferably nearly linearly, as conversion is increased. Preferred catalyst/shuttling agent pairs are those giving polymer $M_n$ as a function of conversion (or polymer yield) fitting a line with a statistical precision of greater than 0.95, preferably greater than 0.99.

Steps I-III are then carried out for one or more additional pairing of potential catalysts and/or putative shuttling agents.

A suitable composition comprising Catalyst A, Catalyst B, and one or more chain shuttling agents is then selected such that the two catalysts each undergo chain shuttling with one or more of the chain shuttling agents, and Catalyst A has a higher comonomer incorporation index (or is otherwise capable of selectively forming polymer) compared to Catalyst B under the reaction conditions chosen. Preferably, at least one of the chain shuttling agents undergoes polymer transfer in both the forward and reverse directions (as identified in the foregoing test) with both Catalyst A and Catalyst B. In addition, the chain shuttling agent preferably does not reduce the catalyst activity (measured in weight of polymer produced per weight of catalyst per unit time) of either catalyst (compared to activity in the absence of a shuttling agent) by more than 60 percent. More preferably, such catalyst activity is not reduced by more than 20 percent. Most preferably, the catalyst activity of at least one of the catalysts is increased compared to the catalyst activity in the absence of a shuttling agent.

Alternatively, suitable catalyst/shuttling agent pairs can be detected by performing a series of polymerizations under standard batch reaction conditions and measuring the resulting $M_n$, polydispersity, and polymer yield or production rate. Suitable shuttling agents are characterized by lowering of the resultant $M_n$ without significant broadening of the polydispersity or loss of activity (reduction in yield or rate).

Suitable shuttling agents for use herein include Group 1, 2, 12, and 13 metal compounds or complexes containing at least one $C_{1-20}$ hydrocarbyl group, preferably hydrocarbyl substituted aluminum, gallium or zinc compounds containing from 1 to 12 carbons in each hydrocarbyl group, and reaction products thereof with a proton source. Preferred hydrocarbyl groups are alkyl groups, preferably linear or branched $C_{2-8}$ alkyl groups. Most preferred shuttling agents for use herein are trialkyl aluminum and dialkyl zinc compounds, especially triethylaluminum, tri(i-propyl)aluminum, tri(i-butyl)aluminum, tri(n-hexyl)aluminum, tri(n-octyl)aluminum, triethylgallium, and diethylzinc. Additional suitable shuttling agents include the reaction product or mixture formed by combining the foregoing organometal compound, preferably a tri($C_{1-8}$) alkyl aluminum or di($C_{1-8}$) alkyl zinc compound, especially triethylaluminum, tri(i-propyl)aluminum, tri(i-butyl)aluminum, tri(n-hexyl)aluminum, tri(n-octyl)aluminum, and diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl) amine, bis(2,3,6,7-dibenzo-1-azacycloheptaneamine), and 2,6-diphenylphenol. Preferably, sufficient amine or hydroxyl reagent is used such that one hydrocarbyl group remains per metal atom. The primary reaction products of the foregoing combinations most preferable for use in the present invention as shuttling agents are n-octylaluminum di(bis(trimethylsilyl) amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide).

Suitable chain shuttling agents are further disclosed in PCT Publication Nos. WO2005/090425, WO2005/090426, and WO2005/090427, the entire disclosures of which are hereby incorporated herein by reference.

Catalysts

Suitable catalysts for use herein include any compound or combination of compounds that is adapted for preparing polymers of the desired composition or type. Both heterogeneous and homogeneous catalysts may be employed. Examples of heterogeneous catalysts include Ziegler-Natta compositions, particularly Group 4 metal halides supported on Group 2 metal halides or mixed halides and alkoxides and chromium or vanadium based catalysts. Preferably, however, for ease of use and for production of narrow molecular weight polymer segments in solution, the catalysts for use herein are homogeneous catalysts comprising a relatively pure organometallic compound or metal complex, especially compounds or complexes based on metals selected from Groups 3-10 or the Lanthanide series of the Periodic Table of the Elements. It is preferred that any catalyst employed herein not significantly detrimentally affect the performance of the other catalyst under the conditions of the present polymerization. Preferably, no catalyst is reduced in activity by greater than 25 percent, more preferably greater than 10 percent, under the conditions of the present polymerization.

Metal complexes for use herein as Catalyst A include complexes of transition metals selected from Groups 3 to 15 of the Period Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein:

M is a metal selected from Groups 3-15, preferably 3-10, more preferably 4-8, and most preferably Group 4 of the Periodic Table of the Elements;

K independently each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X, or to both Z and X;

X independently each occurrence is a monovalent, anionic moiety having up to 40 non-hydrogen atoms, optionally one or more X groups may be bonded together thereby forming a divalent or polyvalent anionic group, and further optionally one or more X groups and one or more Z groups may be bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Suitable metal complexes include those containing from 1 to 3 π-bonded anionic or neutral ligand groups, which may be cyclic or non-cyclic delocalized π-bonded anionic ligand groups. Exemplary of such π-bonded groups are conjugated and nonconjugated, cyclic and non-cyclic diene and dienyl groups, allyl groups, boratabenzene groups, phosphole, and arene groups. By the term "π-bonded" it is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms where the heteroatom is selected from Group 14-16 of the Periodic Table of the Elements, and such hydrocarbyl-substituted heteroatom radicals further substituted with a Group 15 or 16 hetero atom containing moiety. In addition, two or more such radicals may together form a fused ring system, including partially or fully hydrogenated fused ring systems, or they may form a metallocycle with the metal. Included within the term "hydrocarbyl" are $C_1$-$C_{20}$ straight, branched and cyclic alkyl radicals, $C_6$-$C_{20}$ aromatic radicals, $C_7$-$C_{20}$ alkyl-substituted aromatic radicals, and $C_7$-$C_{20}$ aryl-substituted alkyl radicals. Suitable hydrocarbyl-substituted heteroatom radicals include mono-, di- and tri-substituted radicals of boron, silicon, germanium, nitrogen, phosphorus and oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 and 16 hetero atom containing moieties include amino, phosphino, alkoxy, and alkylthio moieties or divalent derivatives thereof, for example, amide, phosphide, alkyleneoxy or alkylenethio groups bonded to the transition metal or Lanthanide metal, and bonded to the hydrocarbyl group, n-bonded group, or hydrocarbyl-substituted heteroatom.

Examples of suitable anionic, delocalized n-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_1$-$C_{10}$ hydrocarbyl-substituted or tris($C_1$-$C_{10}$ hydrocarbyl)silyl-substituted derivatives thereof. Preferred anionic delocalized n-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cylcopenta(l)phenanthren1-yl, and tetrahydroindenyl.

Boratabenzyl ligands are anionic ligands which are boron containing analogues to benzene, and are further described, for example, by G. Herberich, et al., in *Organometallics*, 14, 1, 471-480 (1995), the entire disclosure of which is hereby incorporated herein by reference.

Phospholes are anionic ligands that are phosphorus containing analogues to a cyclopentadienyl group, and are further described, for example, in PCT Publication No. WO 98/50392, the entire disclosure of which is hereby incorporated herein by reference.

Preferred transition metal complexes for use herein correspond to the formula: $MK_kX_xZ_z$, or a dimer thereof, wherein:

M is a Group 4 metal;
K is a group containing delocalized π-electrons through which K is bound to M, said K group containing up to 50 atoms not counting hydrogen atoms, optionally two K groups may be joined together forming a bridged structure, and further optionally one K may be bound to X or Z;
X each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;
Z independently each occurrence is a neutral, Lewis base donor ligand of up to 50 non-hydrogen atoms containing at least one unshared electron pair through which Z is coordinated to M;
k is an integer from 0 to 3;
x is an integer from 1 to 4;
z is a number from 0 to 3; and
the sum, k+x, is equal to the formal oxidation state of M.

Preferred complexes include those containing either one or two K groups. The latter complexes include those containing a bridging group linking the two K groups. Preferred bridging groups are those corresponding to the formula $(ER'_2)_e$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and e is 1 to 8. Preferably, R' independently each occurrence is methyl, ethyl, propyl, benzyl, tert-butyl, phenyl, methoxy, ethoxy or phenoxy. In some embodiments, racemic ethylene bisindenyl complexes of Group 4 metals, especially Zr, and inertly substituted derivatives thereof, such as 1-, or 2-t-butyldimethylsiloxy-substituted ethylene bis(indenyl)zirconium complexes, as disclosed in *Macromolecules* 33, 9200-9204 (2000), ethylenebis(4,5,6,7-tetrahydro-1-indenyl) zirconium complexes, or other racemic ethylene bis(indenyl) zirconium complexes capable of 2,1- or 3,1-monomer insertion or chain walking are usefully employed.

Examples of suitable metal complexes of the foregoing formula are further disclosed in PCT Publication Nos. WO2005/090425, WO2005/090426, and WO2005/090427, the entire disclosures of which are hereby incorporated herein by reference.

A further class of suitable metal complexes for use herein corresponds to the formula: $MKZ_zX_x$, or a dimer thereof, wherein M, K, X, x and z are as previously defined, and Z is a substituent of up to 50 non-hydrogen atoms that together with K forms a metallocycle with M. Preferred Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M. This class of Group 4 metal complexes includes "constrained geometry catalysts," as further disclosed in PCT Publication Nos. WO2005/090425, WO2005/090426, and WO2005/090427, the entire disclosures of which are hereby incorporated herein by reference.

Additional examples of suitable metal complexes for use herein as catalyst (A) are polycyclic complexes corresponding to the formula:

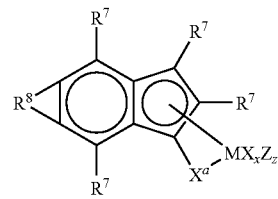

where M is titanium in the +2, +3 or +4 formal oxidation state;
$R^7$ independently each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

R[8] is a divalent hydrocarbylene- or substituted hydrocarbylene group forming a fused system with the remainder of the metal complex, said R[8] containing from 1 to 30 atoms not counting hydrogen;

X[a] is a divalent moiety, or a moiety comprising one σ-bond and a neutral two electron pair able to form a coordinate-covalent bond to M, said X[a] comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently each occurrence is a neutral ligating compound having up to 20 atoms;

x is 0, 1 or 2; and z is 0 or 1.

Additional examples of suitable metal complexes for use herein as catalyst (A) include those of the formula:

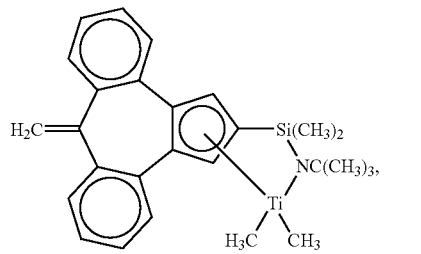

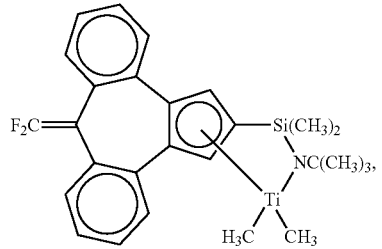

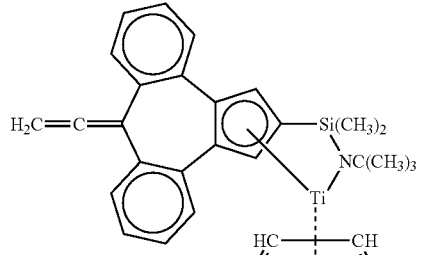

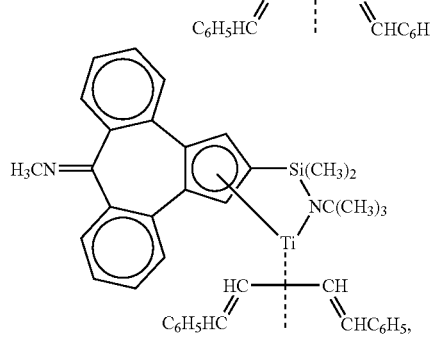

Further illustrative examples of metal complexes for use herein correspond to the formula:

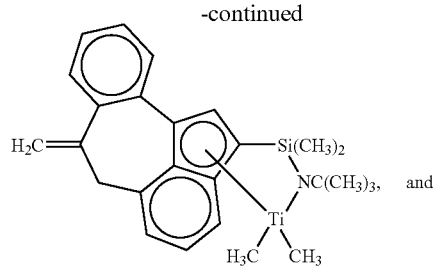

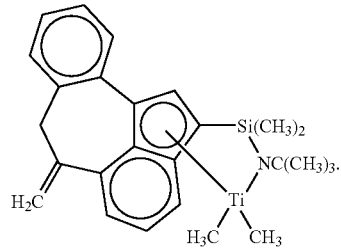

Further illustrative examples of metal complexes for use herein correspond to the formula:

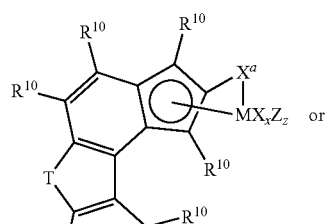

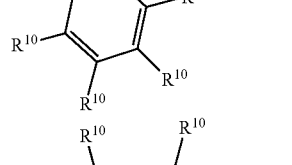

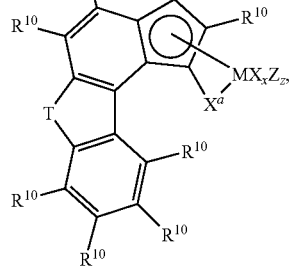

where M is titanium in the +2, +3 or +4 formal oxidation state;

T is —NR[9]— or —O—;

R[9] is hydrocarbyl, silyl, germyl, dihydrocarbylboryl, or halohydrocarbyl or up to 10 atoms not counting hydrogen;

R[10] independently each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^{10}$ group having up to 40 atoms not counting hydrogen atoms, and optionally two or more of the foregoing adjacent $R^{10}$ groups may together form a divalent derivative thereby forming a saturated or unsaturated fused ring;

$X^a$ is a divalent moiety lacking in delocalized π-electrons, or such a moiety comprising one σ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently each occurrence is a neutral ligating compound having up to 20 atoms;

x is 0, 1, 2 or 3; and z is 0 or 1.

Highly preferably T is =N(CH$_3$), X is halo or hydrocarbyl, x is 2, $X^a$ is dimethylsilane, z is 0, and $R^{10}$ each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two $R^{10}$ groups may be joined together.

Illustrative metal complexes of the foregoing formula that may be employed herein further include those disclosed in PCT Publication Nos. WO2005/090425, WO2005/090426, and WO2005/090427, the entire disclosures of which are hereby incorporated herein by reference.

Other delocalized, π-bonded complexes, especially those containing other Group 4 metals, will be apparent to those skilled in the art, and are disclosed among other places in PCT Publication Nos. WO2003/78480, WO2003/78483, WO2002/92610, and WO2002/02577; U.S. Patent Application Publication No. 2003/0004286; and U.S. Pat. Nos. 6,515,155, 6,555,634, 6,150,297, 6,034,022, 6,268,444, 6,015,868, 5,866,704, and 5,470,993. The entire disclosure of each of these references is hereby incorporated herein by reference.

Additional examples of metal complexes that are usefully employed herein as catalyst (A) are complexes of polyvalent Lewis bases, such as compounds corresponding to the formula:

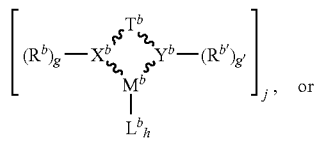, or

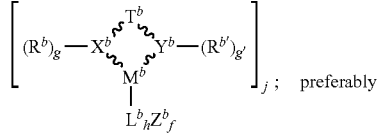; preferably

-continued

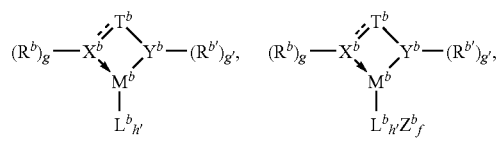

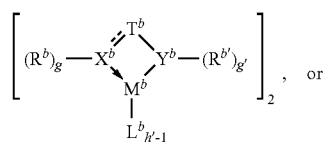, or

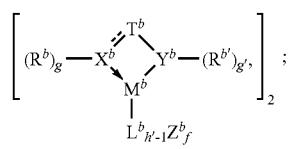;

wherein $T^b$ is a bridging group, preferably containing 2 or more atoms other than hydrogen;

$X^b$ and $Y^b$ are each independently selected from the group consisting of nitrogen, sulfur, oxygen and phosphorus; more preferably both $X^b$ and $Y^b$ are nitrogen;

$R^b$ and $R^{b'}$ independently each occurrence are hydrogen or $C_1$-$C_{50}$ hydrocarbyl groups optionally containing one or more heteroatoms or inertly substituted derivative thereof. Non-limiting examples of suitable $R^b$ and $R^{b'}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable $R^b$ and $R^{b'}$ groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g is 0 or 1;

$M^b$ is a metallic element selected from Groups 3-15, or the Lanthanide series of the Periodic Table of the Elements. Preferably $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are $C_1$-$C_{20}$ alkyl, $C_7$-$C_{20}$ aralkyl, and chloride;

h is an integer from 1 to 6, preferably from 1 to 4, more preferably from 1 to 3, and j is 1 or 2, with the value h x j selected to provide charge balance;

$Z^b$ is a neutral ligand group coordinated to $M^b$, and containing up to 50 atoms not counting hydrogen. Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$, and $R^{b'}$ may be joined together to form a single or multiple ring structure;

h is an integer from 1 to 6, preferably from 1 to 4, more preferably from 1 to 3;

∼∼ indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are $C_1$-$C_8$ straight chain alkyl groups.

At the same time, in this embodiment $R^{b'}$ preferably has relatively high steric hindrance with respect to $Y^b$. Non-limiting examples of suitable $R^{b'}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b'}$ groups in this embodiment contain from 3 to 40, more preferably from 3 to 30, and most preferably from 4 to 20 atoms not counting hydrogen and are branched or cyclic.

Examples of preferred $T^b$ groups are structures corresponding to the following formulas:

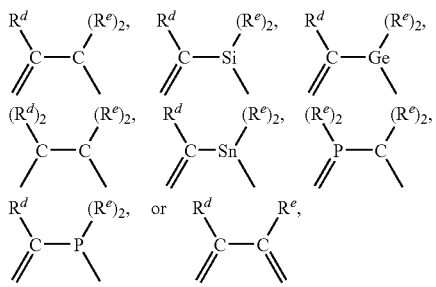

wherein each $R^d$ is $C_1$-$C_{10}$ hydrocarbyl group, preferably methyl, ethyl, n-propyl, i-propyl, t-butyl, phenyl, 2,6-dimethylphenyl, benzyl, or tolyl. Each $R^e$ is $C_1$-$C_{10}$ hydrocarbyl group, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of $R^d$ and $R^e$ groups may together form a polyvalent derivative of a hydrocarbyl group, such as 1,4-butylene, 1,5-pentylene, or a multicyclic, fused ring, polyvalent hydrocarbyl- or heterohydrocarbyl-group, such as naphthalene-1,8-diyl.

Preferred examples of the foregoing polyvalent Lewis base complexes further include those disclosed in PCT Publication Nos. WO2005/090425, WO2005/090426, and WO2005/090427, the entire disclosures of which are hereby incorporated herein by reference.

Highly preferred metal complexes for use herein as catalyst (A) correspond to the formula:

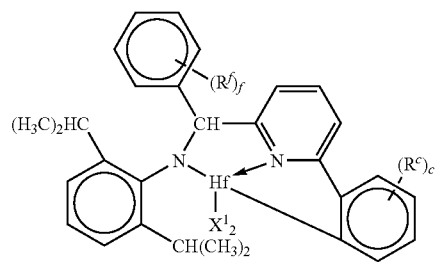

wherein $X^1$ each occurrence is halide, N,N-dimethylamido, or $C_1$-$C_4$ alkyl, and preferably each occurrence $X^1$ is methyl;

$R^f$ independently each occurrence is hydrogen, halogen, $C_1$-$C_{20}$ alkyl, or $C_6$-$C_{20}$ aryl, or two adjacent $R^f$ groups are joined together thereby forming a ring, and f is 1-5; and $R^c$ independently each occurrence is hydrogen, halogen, $C_1$-$C_{20}$ alkyl, or $C_6$-$C_{20}$ aryl, or two adjacent $R^c$ groups are joined together thereby forming a ring, and c is 1-5.

Most highly preferred examples of metal complexes for use herein as catalyst (A) are complexes of the following formulas:

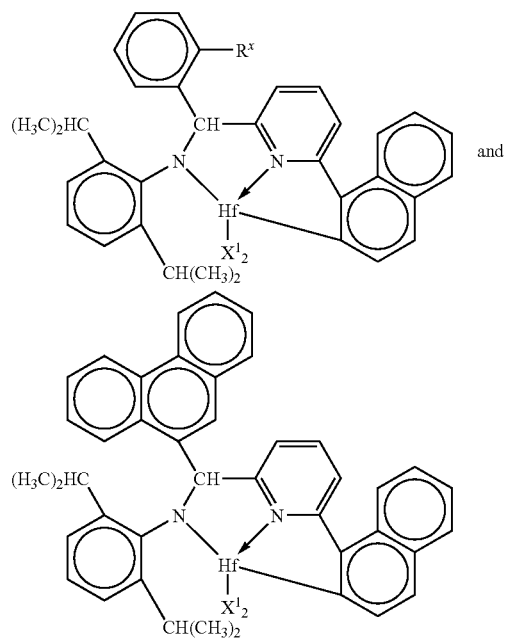

wherein $R^x$ is $C_1$-$C_4$ alkyl or cycloalkyl, preferably methyl, isopropyl, t-butyl or cyclohexyl; and $X^1$ each occurrence is halide, N,N-dimethylamido, or $C_1$-$C_4$ alkyl, preferably methyl.

Under the reaction conditions used to prepare the metal complexes used herein, the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Additional suitable metal complexes of polyvalent Lewis bases for use herein include compounds corresponding to the formula:

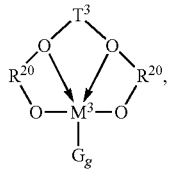

where:
- $R^{20}$ is an aromatic or inertly substituted aromatic group containing from 5 to 20 atoms not counting hydrogen, or a polyvalent derivative thereof;
- $T^3$ is a hydrocarbylene or silane group having from 1 to 20 atoms not counting hydrogen, or an inertly substituted derivative thereof;
- $M^3$ is a Group 4 metal, preferably zirconium or hafnium;
- G is an anionic, neutral or dianionic ligand group; preferably a halide, hydrocarbyl or dihydrocarbylamide group having up to 20 atoms not counting hydrogen;
- g is a number from 1 to 5 indicating the number of such G groups; and
- bonds and electron donative interactions are represented by lines and arrows respectively.

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005 and 6,103,657, PCT Publication Nos. WO2002/38628 and WO2003/40195, and U.S. Patent Application Publication No. 2004/0220050, the entire disclosures of which are hereby incorporated herein by reference.

Additional examples of suitable metal complexes are aromatic dioxyimine complexes of zirconium, corresponding to the formula:

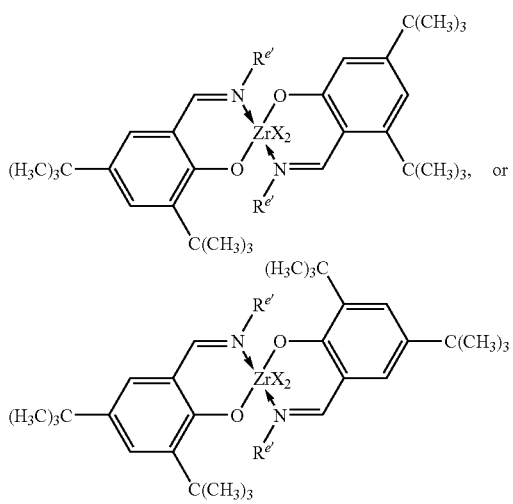

wherein $X^2$ is as previously defined, preferably $C_1$-$C_{10}$ hydrocarbyl, most preferably methyl or benzyl; and
$R^{e'}$ is methyl, isopropyl, t-butyl, cyclopentyl, cyclohexyl, 2-methylcyclohexyl, 2,4-dimethylcyclohexyl, 2-pyrrolyl, N-methyl-2-pyrrolyl, 2-piperidenyl, N-methyl-2-piperidenyl, benzyl, o-tolyl, 2,6-dimethylphenyl, perfluorophenyl, 2,6-di(isopropyl)phenyl, or 2,4,6-trimethylphenyl.

Also suitable are the catalysts previously disclosed in *J. Am. Chem. Soc.*, 118, 267-268 (1996), *J. Am. Chem. Soc.*, 117, 6414-6415 (1995), and *Organometallics*, 16, 1514-1516 (1997), among other disclosures. The entire disclosure of each of these references is hereby incorporated herein by reference.

Additional suitable metal complexes include metal complexes corresponding to the formula:

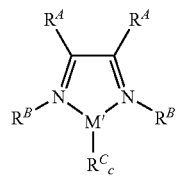

where M' is a metal of Groups 4-13, preferably Groups 8-10, most preferably Ni or Pd;
$R^A$, $R^B$ and $R^C$ are univalent or neutral substituents, which also may be joined together to form one or more divalent substituents, and
c is a number chosen to balance the charge of the metal complex.

Preferred examples of the foregoing metal complexes are further disclosed in PCT Publication No. WO2005/090426, the entire disclosure of which is hereby incorporated herein by reference.

In embodiments wherein the copolymer is produced by the polymerization of a single monomer, ethylene, suitable metal compounds for use as catalyst (B) include the foregoing metal compounds mentioned with respect to catalyst (A) as well as other metal compounds, with the proviso that they result in formation of at least some hyperbranch- or long chain branch-formation. In such embodiments, the following metal compounds or inertly coordinated derivatives thereof are especially suited for use as catalyst (B): racemic ethylene bisindenyl complexes of Group 4 metals, especially Zr, and inertly substituted derivatives thereof, such as 1-, or 2-t-butyldimethylsiloxy-substituted ethylene bis (indenyl) zirconium complexes, as disclosed in *Macromolecules* 33, 9200-9204 (2000), ethylenebis(4,5,6,7-tetrahydro-1-indenyl) zirconium-complexes racemic ethylene bis(indenyl)zirconium complexes, and metal complexes of the formula:

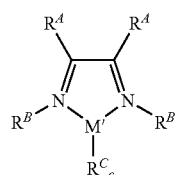

where M' is a metal of Groups 4-13, preferably Groups 8-10, most preferably Ni or Pd;
$R^A$, $R^B$ and $R^C$ are univalent or neutral substituents, which also may be joined together to form one or more divalent substituents, and
c is a number chosen to balance the charge of the metal complex.

Preferred examples of the foregoing metal complexes for use as catalyst (B) are compounds corresponding to the formula:

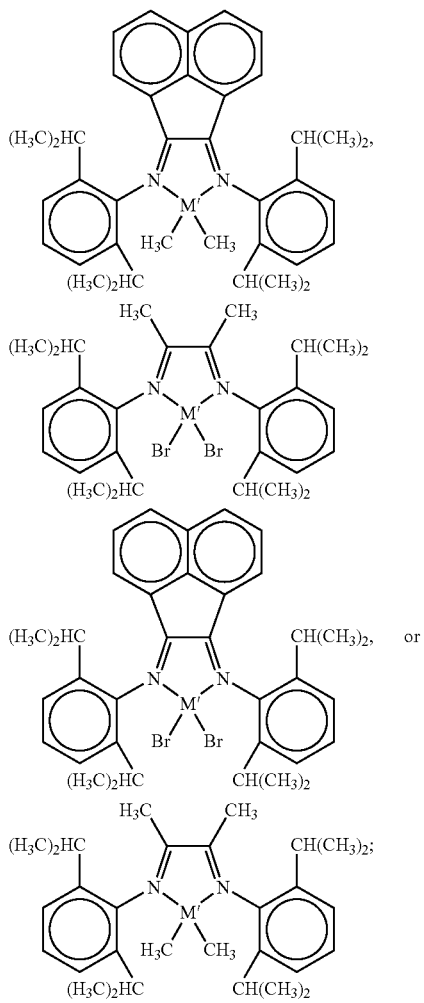

wherein M' is Pd or Ni.

In embodiments wherein the copolymer is produced by the polymerization of an addition polymerizable monomer mixture predominantly comprised of propylene, 4-methyl-1-pentene, styrene, or another $C_4$-$C_{20}$ α-olefin with ethylene and/or one or more different addition polymerizable comonomers, suitable metal compounds for use as catalyst (B) include the foregoing metal compounds mentioned with respect to catalyst (A) as well as other metal compounds, with the proviso, in a particular embodiment, that they incorporate comonomer relatively poorly compared to catalyst (A) or otherwise produce a more highly tactic polymer. In such embodiments, the following metal compounds or inertly coordinated derivatives thereof are especially suited for use as catalyst (B): racemic ethylene bisindenyl- or substituted bis(indenyl)-complexes of Group 4 metals, especially Zr, such as ethylenebis(4,5,6,7-tetrahydro-1-indenyl) zirconium- or racemic ethylene bis(indenyl)zirconium-complexes.

In embodiments wherein the copolymer is produced by the polymerization of ethylene and one or more copolymerizable comonomers, suitable metal compounds for use as catalyst (B) include the foregoing metal compounds mentioned with respect to catalyst (A) as well as other metal compounds, with the proviso, in a particular embodiment, that they incorporate comonomer relatively poorly compared to catalyst (A). In such embodiments, the following metal compounds are especially suited for use as catalyst (B):

Group 4-10 derivatives corresponding to the formula:

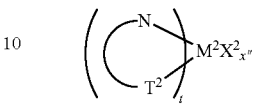

wherein $M^2$ is a metal of Groups 4-10 of the Periodic Table of the Elements, preferably Group 4 metals, Ni(II) or Pd(II), most preferably zirconium;

$T^2$ is a nitrogen, oxygen or phosphorus containing group;

$X^2$ is a halo, hydrocarbyl, or hydrocarbyloxy;

t is one or two;

x" is a number selected to provide charge balance;

and $T^2$ and N are linked by a bridging ligand.

Such catalysts have been previously disclosed in *J. Am. Chem. Soc.*, 118, 267-268 (1996), *J. Am. Chem. Soc.*, 117, 6414-6415 (1995) and *Organometallics*, 16, 1514-1516 (1997), among other disclosures. Preferred examples of the foregoing metal complexes for use as catalyst (B) are aromatic diimine or aromatic dioxyimine complexes of Group 4 metals, especially zirconium, corresponding to the formula:

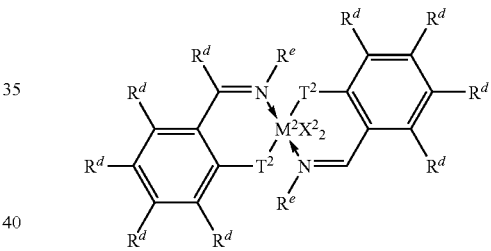

wherein $M^2$, $X^2$ and $T^2$ are as previously defined $R^d$ independently each occurrence is hydrogen, halogen, or $R^e$; and $R^e$ independently each occurrence is $C_1$-$C_{20}$ hydrocarbyl or a heteroatom-, especially a F, N, S or P-substituted derivative thereof, more preferably $C_1$-$C_{10}$ hydrocarbyl or a F or N substituted derivative thereof, most preferably alkyl, dialkylaminoalkyl, pyrrolyl, piperidenyl, perfluorophenyl, cycloalkyl, (poly)alkylaryl, or aralkyl.

Most preferred examples of the foregoing metal complexes for use as catalyst (B) are aromatic dioxyimine complexes of zirconium, corresponding to the formula:

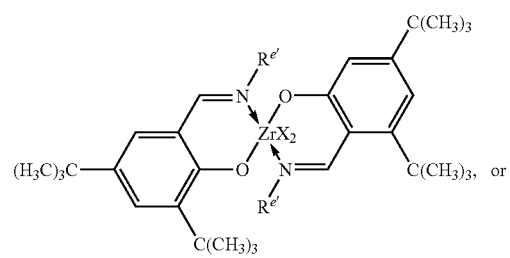

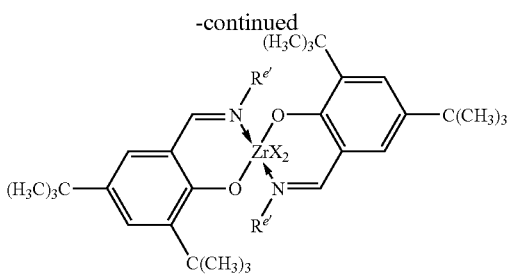

wherein $X^2$ is as previously defined, preferably $C_1$-$C_{10}$ hydrocarbyl, most preferably methyl or benzyl; and $R^{e'}$ is methyl, isopropyl, t-butyl, cyclopentyl, cyclohexyl, 2-methylcyclohexyl, 2,4-dimethylcyclohexyl, 2-pyrrolyl, N-methyl-2-pyrrolyl, 2-piperidenyl, N-methyl-2-piperidenyl, benzyl, o-tolyl, 2,6-dimethylphenyl, perfluorophenyl, 2,6-di(isopropyl)phenyl, or 2,4,6-trimethylphenyl.

The foregoing complexes for use as catalyst (B) also include certain phosphinimine complexes as disclosed in European Publication EP-A-890581, the entire disclosure of which is hereby incorporated herein by reference. These complexes correspond to the formula:

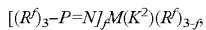

wherein $R^f$ is a monovalent ligand or two $R^f$ groups together are a divalent ligand, preferably $R^f$ is hydrogen or $C_1$-$C_4$ alkyl;

M is a Group 4 metal, $K^2$ is a group containing delocalized π-electrons through which $K^2$ is bound to M, said $K^2$ group containing up to 50 atoms not counting hydrogen atoms, and f is 1 or 2.

The skilled artisan will appreciate that in other embodiments of the invention, the criterion for selecting a combination of catalyst (A) and (B) may be any other distinguishing property of the resulting polymer blocks, such as combinations based on tacticity (isotactic/syndiotactic, isotactic/atactic or syndiotactic/atactic), regio-error content, or combinations thereof, for example atactic blocks with regio-error-containing blocks or atactic blocks with long chain branched blocks.

Suitable catalysts are further described in PCT Publication Nos. WO2005/090425, WO2005/090426, and WO2005/090427, the entire disclosures of which are hereby incorporated herein by reference.

Cocatalysts

Each of the metal complex catalysts (A) and (B) may be activated to form the active catalyst composition by combination with a cocatalyst, preferably a cation forming cocatalyst, a strong Lewis acid, or a combination thereof. In a preferred embodiment, the shuttling agent is employed both for purposes of chain shuttling and as the cocatalyst component of the catalyst composition.

The metal complexes desirably are rendered catalytically active by combination with a cation forming cocatalyst, such as those previously known in the art for use with Group 4 metal olefin polymerization complexes. Suitable cation forming cocatalysts for use herein include neutral Lewis acids, such as $C_1$-$C_{30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl) boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations, for example, in the following references: European Publication EP-A-277003; U.S. Pat. Nos. 5,153,157, 5,064,802, 5,321,106, 5,721,185, 5,350,723, 5,425,872, 5,625,087, 5,883,204, and 5,919,983, 5,783,512; and PCT Publication Nos. WO99/15534 and WO99/42467, the entire disclosures of which are hereby incorporated herein by reference.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane may be used as activating cocatalysts. Preferred molar ratios of metal complex:tris(pentafluorophenyl-borane):alumoxane are from 1:1:1 to 1:5:20, more preferably from 1:1:1.5 to 1:5:10.

In one embodiment, suitable ion forming compounds useful as cocatalysts comprise a cation which is a Bronsted acid capable of donating a proton, and a compatible, noncoordinating anion, $A^-$. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably, such cocatalysts may be represented by the following general formula:

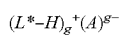

wherein L* is a neutral Lewis base;

(L*-H)⁺ is a conjugate Bronsted acid of L*;
A^{g-} is a noncoordinating, compatible anion having a charge of g-, and
g is an integer from 1 to 3.
More preferably A^{g-} corresponds to the formula:

[M'Q₄]⁻ wherein M' is boron or aluminum in the +3 formal oxidation state; and
Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433, the entire disclosure of which is hereby incorporated herein by reference.

In a more preferred embodiment, d is one, that is, the counter ion has a single negative charge and is A⁻. Activating cocatalysts comprising boron which are particularly useful in the preparation of the catalysts herein may be represented by the following general formula:

(L*-H)⁺(BQ₄)⁻ wherein L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12}$-$C_{40}$ alkyl groups. Most preferably, Q is each occurrence a fluorinated aryl group, especially a pentafluorophenyl group.

Preferred (L*-H)⁺ cations are methyldioctadecylammonium cations, dimethyloctadecylammonium cations, and ammonium cations derived from mixtures of trialkyl amines containing one or two $C_{14}$-$C_{18}$ alkyl groups.

Another suitable ion forming, activating cocatalyst comprises a salt of a cationic oxidizing agent and a noncoordinating, compatible anion represented by the formula:

(Ox^{h+})_g(A^{g-})_h, wherein Ox^{h+} is a cationic oxidizing agent having a charge of h+;
h is an integer from 1 to 3; and
A^{g-} and g are as previously defined.
Examples of cationic oxidizing agents include: ferrocenium, hydrocarbyl-substituted ferrocenium, Ag⁺ or Pb⁺². Preferred embodiments of A^{g-} are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a non-coordinating, compatible anion represented by the formula:

[C]⁺A⁻ wherein [C]⁺ is a $C_1$-$C_{20}$ carbenium ion; and
A⁻ is a noncoordinating, compatible anion having a charge of -1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

(Q¹₃Si)⁺A⁻ wherein Q¹ is $C_1$-$C_{10}$ hydrocarbyl, and A⁻ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.*, 1993, 383-384, as well as Lambert, J. B., et al., *Organometallics*, 1994, 13, 2430-2443, the disclosures of which are hereby incorporated herein by reference. The use of the above silylium salts as activating cocatalysts for addition polymerization catalysts is disclosed in U.S. Pat. No. 5,625,087, the entire disclosure of which is hereby incorporated herein by reference.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the entire disclosure of which is hereby incorporated herein by reference.

Suitable activating cocatalysts for use herein also include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed, for example, in U.S. Pat. Nos. 6,214,760, 6,160,146, 6,140,521, and 6,696,379, the entire disclosures of which are hereby incorporated herein by reference.

A class of cocatalysts comprising non-coordinating anions generically referred to as expanded anions, further disclosed in U.S. Pat. No. 6,395,671, the entire disclosure of which is hereby incorporated herein by reference, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

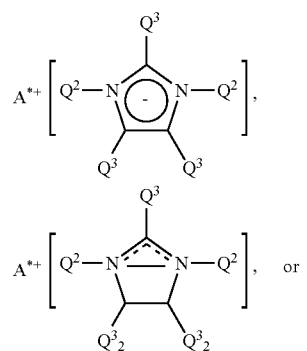

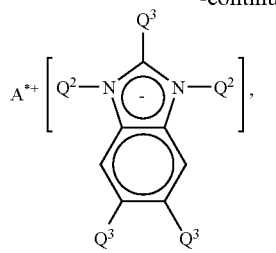

wherein A*+ is a cation, especially a proton containing cation, and preferably is a trihydrocarbyl ammonium cation containing one or two $C_{10}$-$C_{40}$ alkyl groups, especially a methyldi($C_{14}$-$C_{20}$ alkyl)ammonium cation, $Q^3$, independently each occurrence, is hydrogen or a halo, hydrocarbyl, halocarbyl, halohydrocarbyl, silylhydrocarbyl, or silyl, (including mono-, di- and tri-(hydrocarbyl)silyl) group of up to 30 atoms not counting hydrogen, preferably $C_1$-$C_{20}$ alkyl, and $Q^2$ is tris(pentafluorophenyl)borane or tris(pentafluorophenyl)alumane.

Other activators include those described in PCT Publication Nos. WO98/07515, the entire disclosure of which is hereby incorporated herein by reference, such as tris (2,2',2"-nonafluorobiphenyl)fluoroaluminate. Combinations of activators are also contemplated by the invention, for example, alumoxanes and ionizing activators in combinations, see for example, European Publication EP-A-0573120, PCT Publication Nos. WO94/07928 and WO95/14044, and U.S. Pat. Nos. 5,153,157 and 5,453,410, the entire disclosures of which are hereby incorporated herein by reference. WO98/09996 describes activating catalyst compounds with perchlorates, periodates and iodates, including their hydrates. WO99/18135 describes the use of organoboroaluminum activators. WO03/10171 discloses catalyst activators that are adducts of Bronsted acids with Lewis acids. Each of these references is hereby incorporated herein by reference in its entirety. Other activators or methods for activating a catalyst compound are described in, for example, U.S. Pat. Nos. 5,849,852, 5,859,653, 5,869,723, European Publication EP-A-615981, and PCT Publication No. WO98/32775, the entire disclosures of which are hereby incorporated herein by reference. All of the foregoing catalyst activators as well as any other known activator for transition metal complex catalysts may be employed alone or in combination according to the present invention, however, for best results alumoxane containing cocatalysts are avoided.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris(pentafluorophenyl)borane, where used as an activating cocatalyst is employed in a molar ratio to the metal complex of from 0.5:1 to 10:1, more preferably from 1:1 to 6:1, most preferably from 1:1 to 5:1. The remaining activating cocatalysts are generally employed in approximately equimolar quantity with the metal complex.

Suitable catalyst activators are further disclosed in PCT Publication Nos. WO2005/090425, WO2005/090426, and WO2005/090427, the entire disclosures of which are hereby incorporated herein by reference.

In the process of the invention, an activated catalyst site A, under polymerization conditions, forms a polymer chain attached to active catalyst site A. Similarly, active catalyst site B produces a differentiated polymer chain attached to active catalyst site B. A chain shuttling agent C1, attached to a polymer chain produced by active catalyst B, exchanges its polymer chain for the polymer chain attached to catalyst site A. Additional chain growth under polymerization conditions causes formation of a multi-block copolymer attached to active catalyst site A. Similarly, chain shuttling agent C2, attached to a polymer chain produced by active catalyst site A, exchanges its polymer chain for the polymer chain attached to catalyst site B. Additional chain growth under polymerization conditions causes formation of a multi-block copolymer attached to active catalyst site B. The growing multi-block copolymers are repeatedly exchanged between active catalyst A and active catalyst B by means of a shuttling agent C resulting in formation of a block or segment of differing properties whenever exchange to the opposite active catalyst site occurs. The growing polymer chains may be recovered while attached to a chain shuttling agent and functionalized if desired. Alternatively, the resulting polymer may be recovered by scission from the active catalyst site or the shuttling agent, through use of a proton source or other killing agent.

It is believed, without wishing to be bound by such belief, that the composition of the respective segments or blocks, and especially of the end segments of the polymer chains, may be influenced through selection of process conditions or other process variables. In the polymers of the invention, the nature of the end segments is determined by the relative rates of chain transfer or termination for the respective catalysts as well as by the relative rates of chain shuttling. Possible chain termination mechanisms include, but are not limited to, β-hydrogen elimination, β-hydrogen transfer to monomer, β-methyl elimination, and chain transfer to hydrogen or other chain-terminating reagent such as organosilane or chain functionalizing agent. Accordingly, when a low concentration of chain shuttling agent is used, the majority of polymer chain ends will be generated in the polymerization reactor by one of the foregoing chain termination mechanisms and the relative rates of chain termination for catalyst (A) and (B) will determine the predominant chain terminating moiety. That is, the catalyst having the fastest rate of chain termination will produce relatively more chain end segments in the finished polymer.

In contrast, when a high concentration of chain shuttling agent is employed, the majority of the polymer chains within the reactor and upon exiting the polymerization zone are attached or bound to the chain shuttling agent. Under these reaction conditions, the relative rates of chain transfer of the polymerization catalysts and the relative rate of chain shuttling of the two catalysts primarily determines the identity of the chain terminating moiety. If catalyst (A) has a faster chain transfer and/or chain shuttling rate than catalyst (B), then the majority of the chain end segments will be those produced by catalyst (A).

At intermediate concentrations of chain shuttling agent, all three of the aforementioned factors are instrumental in determining the identity of the final polymer block. The foregoing methodology may be expanded to the analysis of multi-block polymers having more than two block types and for controlling the average block lengths and block sequences for these polymers. For example, using a mixture of catalysts 1, 2, and 3 with a chain shuttling agent, for which each catalyst type makes a different type of polymer block, produces a linear block copolymer with three different block types. Furthermore, if the ratio of the shuttling rate to the propagation rate for the three catalysts follows the order 1>2>3, then the average block length for the three block types will follow the order 3>2>1, and there will be fewer instances of 2-type blocks adjacent to 3-type blocks than 1-type blocks adjacent to 2-type blocks.

It follows that a method exists for controlling the block length distribution of the various block types. For example, by selecting catalysts 1, 2, and 3 (wherein 2 and 3 produce substantially the same polymer block type), and a chain shuttling agent, and the shuttling rate follows the order 1>2>3, the resulting polymer will have a bimodal distribution of block lengths made from the 2 and 3 catalysts.

During the polymerization, the reaction mixture comprising the monomer or monomers to be polymerized is contacted with the activated catalyst composition according to any suitable polymerization conditions. The process is characterized by use of elevated temperatures and pressures. Hydrogen may be employed as a chain transfer agent for molecular weight control according to known techniques if desired. As in other similar polymerizations, it is highly desirable that the monomers and solvents employed be of sufficiently high purity that catalyst deactivation does not occur. Any suitable technique for monomer purification such as devolatilization at reduced pressure, contacting with molecular sieves or high surface area alumina, or a combination of the foregoing processes may be employed. The skilled artisan will appreciate that the ratio of chain shuttling agent to one or more catalysts and or monomers in the process of the present invention may be varied in order to produce polymers differing in one or more chemical or physical properties.

Supports may be employed in the present invention, especially in slurry or gas-phase polymerizations. Suitable supports include solid, particulated, high surface area, metal oxides, metalloid oxides, or mixtures thereof (interchangeably referred to herein as an inorganic oxide). Examples include: talc, silica, alumina, magnesia, titania, zirconia, $Sn_2O_3$, aluminosilicates, borosilicates, clays, and mixtures thereof. Suitable supports preferably have a surface area as determined by nitrogen porosimetry using the B.E.T. method from 10 to 1000 $m^2/g$, and preferably from 100 to 600 $m^2/g$. The average particle size typically is from 0.1 to 500 µm, preferably from 1 to 200 µm, and more preferably from 10 to 100 µm.

In one embodiment of the invention the present catalyst composition and optional support may be spray dried or otherwise recovered in solid, particulated form to provide a composition that is readily transported and handled. Suitable methods for spray drying a liquid containing slurry are well known in the art and usefully employed herein. Preferred techniques for spray drying catalyst compositions for use herein are described in U.S. Pat. Nos. 5,648,310 and 5,672,669, the entire disclosures of which are hereby incorporated herein by reference.

The polymerization is desirably carried out as a continuous polymerization, preferably a continuous solution polymerization, in which catalyst components, shuttling agent(s), monomers, and optionally solvent, adjuvants, scavengers, and polymerization aids are continuously supplied to the reaction zone and polymer product continuously removed there from. Within the scope of the terms "continuous" and "continuously" as used in this context are those processes in which there are intermittent additions of reactants and removal of products at small regular or irregular intervals, so that, over time, the overall process is substantially continuous.

The catalyst compositions can be advantageously employed in a high pressure, solution, slurry, or gas phase polymerization process. For a solution polymerization process it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion where either the metal complex or the cocatalyst is only poorly soluble is disclosed in U.S. Pat. No. 5,783,512, the entire disclosure of which is hereby incorporated herein by reference. A solution process to prepare the polymers of the present invention, especially a continuous solution process is preferably carried out at a temperature between 80° C. and 250° C., more preferably between 100° C. and 210° C., and most preferably between 110° C. and 210° C. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes employing two or more active polymerization catalyst species, allows the use of elevated reactor temperatures which results in the economical production of multi-block copolymers in high yields and efficiencies. Both homogeneous and plug-flow type reaction conditions may be employed. The latter conditions are preferred where tapering of the block composition is desired.

Both catalyst composition (A) and (B) may be prepared as a homogeneous composition by addition of the requisite metal complexes to a solvent in which the polymerization will be conducted or in a diluent compatible with the ultimate reaction mixture. The desired cocatalyst or activator and the shuttling agent may be combined with the catalyst composition either prior to, simultaneously with, or after combination with the monomers to be polymerized and any additional reaction diluent.

At all times, the individual ingredients as well as any active catalyst composition must be protected from oxygen and moisture. Therefore, the catalyst components, shuttling agent and activated catalysts must be prepared and stored in an oxygen and moisture free atmosphere, preferably a dry, inert gas such as nitrogen.

Without limiting in any way the scope of the invention, one means for carrying out such a polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Preferred solvents include $C_4$-$C_{10}$ hydrocarbons or mixtures thereof, especially alkanes such as hexane or mixtures of alkanes, as well as one or more of the monomers employed in the polymerization.

Two or more catalysts along with cocatalyst and chain shuttling agent are continuously or intermittently introduced in the reactor liquid phase or any recycled portion thereof. The reactor temperature and pressure may be controlled by adjusting the solvent/monomer ratio, the catalyst addition rate, as well as by cooling or heating coils, jackets or both. The polymerization rate is controlled by the rate of catalyst addition. The comonomer content of the polymer product is determined by the ratio of major monomer to comonomer in the reactor, which is controlled by manipulating the respective feed rates of these components to the reactor. The polymer product molecular weight is controlled, optionally, by controlling other polymerization variables such as the temperature, monomer concentration, or by the previously mentioned chain transfer agent, as is well known in the art. Upon exiting the reactor, the effluent is contacted with a catalyst kill agent such as water, steam, or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, catalyst or shuttling agent gradient established between differing regions thereof, optionally accompanied by separated addition/of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989, and 6,683,149, the entire disclosures of which are hereby incorporated herein by reference.

Although not as desired, the catalyst composition may also be prepared and employed as a heterogeneous catalyst by adsorbing the requisite components on an inert inorganic or organic particulated solid, as previously disclosed. In a preferred embodiment, a heterogeneous catalyst is prepared by co-precipitating the metal complex and the reaction product of an inert inorganic compound and an active hydrogen containing activator, especially the reaction product of a tri($C_1$-$C_4$ alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butene may be used in whole or part as the diluent. As with a solution polymerization, the monomer or a mixture of different monomers may be used in whole or part as the diluent. Most preferably at least a major part of the diluent comprises the monomers to be polymerized.

Preferably for use in gas phase polymerization processes, the support material and resulting catalyst has a median particle diameter from 20 to 200 µm, more preferably from 30 µm to 150 µm, and most preferably from 50 µm to 100 µm. Preferably for use in slurry polymerization processes, the support has a median particle diameter from 1 µm to 200 µm, more preferably from 5 µm to 100 µm, and most preferably from 10 µm to 80 µm.

Suitable gas phase polymerization processes for use herein are substantially similar to known processes used commercially on a large scale for the manufacture of polypropylene, ethylene/α-olefin copolymers, and other olefin polymers. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate or fluidization grid, by a flow of fluidization gas.

The gas employed to fluidize the bed comprises the monomer or monomers to be polymerized, and also serves as a heat exchange medium to remove the heat of the reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid, this can suitably be fed to the bed to provide an evaporative cooling effect. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in European Publication EP-89691, U.S. Pat. No. 4,543,399, PCT Publication No. WO94/25495, and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in PCT Publication No. WO94/28032.

The polymerization reaction occurring in the gas fluidized bed is catalyzed by the continuous or semi-continuous addition catalyst composition according to the invention. The catalyst composition may be subjected to a prepolymerization step, for example, by polymerizing a small quantity of olefin monomer in a liquid inert diluent, to provide a catalyst composite comprising supported catalyst particles embedded in olefin polymer particles as well.

The polymer is produced directly in the fluidized bed by polymerization of the monomer or mixture of monomers on the fluidized particles of catalyst composition, supported catalyst composition or prepolymerized catalyst composition within the bed. Start-up of the polymerization reaction is achieved using a bed of preformed polymer particles, which are preferably similar to the desired polymer, and conditioning the bed by drying with inert gas or nitrogen prior to introducing the catalyst composition, the monomers and any other gases which it is desired to have in the recycle gas stream, such as a diluent gas, hydrogen chain transfer agent, or an inert condensable gas when operating in gas phase condensing mode. The produced polymer is discharged continuously or semi-continuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor. Products are readily recovered by exposure to reduced pressure and optionally elevated temperatures (devolatilization) according to known techniques. Typically, the fluidized bed of the gas phase process is operated at temperatures greater than 50° C., preferably from 60° C. to 100° C., more preferably from 70° C. to 110° C.

Examples of gas phase processes which are adaptable for use in the process of this invention are disclosed in U.S. Pat. Nos. 4,588,790, 4,543,399, 5,352,749, 5,436,304, 5,405,922, 5,462,999, 5,461,123, 5,453,471, 5,032,562, 5,028,670, 5,473,028, 5,106,804, 5,556,238, 5,541,270, 5,608,019, and 5,616,661.

As previously mentioned, functionalized derivatives of multi-block copolymers are also included within the present invention. Examples include metallated polymers wherein the metal is the remnant of the catalyst or chain shuttling agent employed, as well as further derivatives thereof, for example, the reaction product of a metallated polymer with an oxygen source and then with water to form a hydroxyl terminated polymer. In another embodiment, sufficient air or other quench agent is added to cleave some or all of the shuttling agent-polymer bonds thereby converting at least a portion of the polymer to a hydroxyl terminated polymer. Additional examples include olefin terminated polymers formed by β-hydride elimination and ethylenic unsaturation in the resulting polymer.

In one embodiment, the multi-block copolymer may be functionalized by maleation (reaction with maleic anhydride or its equivalent), metallation (such as with an alkyl lithium reagent, optionally in the present of a Lewis base, especially an amine, such as tetramethylethylenediamine), or by incorporation of a diene or masked olefin in a copolymerization process. After polymerization involving a masked olefin, the masking group, for example a trihydrocarbylsilane, may be removed thereby exposing a more readily functionalized remnant. Techniques for functionalization of polymers are well known, and disclosed for example in U.S. Pat. No. 5,543,458, and elsewhere.

Because a substantial fraction of the polymeric product exiting the reactor is terminated with the chain shuttling agent, further functionalization is relatively easy. The metallated polymer species can be utilized in well known chemical reactions such as those suitable for other alkyl-aluminum, alkyl-gallium, alkyl-zinc, or alkyl-Group 1 compounds to form amine-, hydroxy-, epoxy-, ketone-, ester-, nitrile-, and other functionalized terminated polymer products. Examples of suitable reaction techniques that are adaptable for use herein are describe in Negishi, "Organometallics in Organic Synthesis," Vol. 1 and 2, (1980), and other standard texts in organometallic and organic synthesis.

Polymer Products

Utilizing the present process, novel polymers, including multi-block copolymers, are readily prepared.

In one embodiment, the polymers preferably comprise in polymerized form, ethylene having blocks of segments characterized by the presence of hyper-branching and other segments of highly crystalline polyethylene. The multi-block copolymers of this embodiment are believed to be characterized by the presence of differentiated blocks within the polymer chains, having both crystalline and amorphous nature. The presence of such differentiated blocks in the polymers can be identified by unique TREF elution curves as well as ATREFF or other standard analytical techniques. The multi-block polymers of this embodiment preferably possess a heat of fusion of 130 J/g or less, an ethylene content (that is —$CH_2$—$CH_2$ polymer segments) of at least 50 weight percent, preferably at least 90 percent, a glass transition temperature, $T_g$, of less than −25° C., more preferably less than −30° C., and/or one and only one $T_m$. Additionally, the polymers of the invention can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. Desirably, the polymers of the invention can have molecular weights, $M_w$, from 1,000 g/mole to 5,000,000 g/mole, preferably from 1000 g/mole to 1,000,000, more preferably from 10000 g/mole to 500,000 g/mole, and especially from 10,000 g/mole to 300,000 g/mole. The density of the polymers of the invention can be from 0.80 to 0.99 g/cm$^3$ and preferably for ethylene containing polymers from 0.85 g/cm$^3$ to 0.97 g/cm$^3$. Polymers of this embodiment are further disclosed in PCT Publication No. WO2005/090425, the entire disclosure of which is hereby incorporated herein by reference.

In another embodiment, the polymers prepared by the present process are multi-block copolymers of propylene or 4-methyl-1-pentene and one or more comonomers. Preferably, the polymers comprise in polymerized form, propylene and ethylene and/or one or more $C_4$-$C_{20}$ α-olefin comonomers, and/or one or more additional copolymerizable comonomers or they comprise 4-methyl-1-pentene and ethylene and/or one or more $C_4$-$C_{20}$ α-olefin comonomers, and/or one or more additional copolymerizable comonomers. Preferred α-olefins are $C_4$-$C_8$ α-olefins. Suitable comonomers are selected from diolefins, cyclic olefins, and cyclic diolefins, halogenated vinyl compounds, and vinylidene aromatic compounds. Comonomer content in the resulting interpolymers may be measured using any suitable technique, with techniques based on nuclear magnetic resonance (NMR) spectroscopy preferred. It is highly desirable that some or all of the polymer blocks comprise amorphous or relatively amorphous polymers such as copolymers of propylene or 4-methyl-1-pentene and a comonomer, especially random copolymers of propylene or 4-methyl-1-pentene with ethylene, and any remaining polymer blocks (hard segments), if any, predominantly comprise propylene or 4-methyl-1-pentene in polymerized form. Preferably such segments are highly crystalline or stereospecific polypropylene or poly-4-methyl-1-pentene, especially isotactic homopolymers, containing at least 99 mole percent propylene or 4-methyl-1-pentene therein. Further preferably, the interpolymers comprise from 10 to 90 percent crystalline or relatively hard segments and 90 to 10 percent amorphous or relatively amorphous segments (soft segments). Within the soft segments, the mole percent propylene, 4-methyl-1-pentene, or other α-olefin may range from 1 to 85 percent, preferably from 5 to 50 mole percent. Alternatively, the soft segments may result from polymerization of a single monomer (or more than one monomer), especially ethylene alone, under conditions leading to formation of branching, 1,3-monomer addition sequences, or long chain branching as a result of chain walking or other branch forming process. The polymers may be differentiated from conventional, random copolymer, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the polymers of the invention have better (higher) heat resistance as measured by melting point, higher TMA penetration temperature, higher high-temperature tensile strength, and/or higher high-temperature torsion modulus as determined by dynamic mechanical analysis. Compared to a random copolymer comprising the same monomers and monomer content, polymers of the invention may have one or more of the following: lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance. Further preferably, the polymers of this embodiment have an ethylene content of from 60 to 90 percent, a diene content of from 0.1 to 10 percent, and a propylene and/or α-olefin content of from 10 to 40 percent, based on the total weight of the polymer. Preferred polymers are high molecular weight polymers, having a weight average molecular weight ($M_w$) of from 10,000 to 2,500,000 and a polydispersity of less than 3.5, more preferably less than 3.0. More preferably, such polymers have an ethylene content of from 65 to 75 percent, a diene content of from 0 to 6 percent, a propylene and/or α-olefin content of from 20 to 35 percent, a $M_w$ of from 20,000 to 250,000 and a polydispersity of from 1.5 to 3.0. Polymers of this embodiment are further disclosed in PCT Publication No. WO2005/090426, the entire disclosure of which is hereby incorporated herein by reference.

In another embodiment, the polymers preferably comprise in polymerized form ethylene and at least one $C_3$-$C_{20}$ α-olefin comonomer, and optionally one or more additional copolymerizable comonomers. Preferred α-olefins are $C_3$-$C_8$ α-olefins. Suitable comonomers are selected from diolefins, cyclic olefins, and cyclic diolefins, halogenated vinyl compounds, and vinylidene aromatic compounds. In a first particular aspect of this embodiment, the polymer has at least one melting point, $T_m$, in degrees Celsius and density, d*, in grams/cubic centimeter, wherein the numerical values of the variables correspond to the relationship:

$$T_m > -2002.9 + 4538.5(d^*) - 2422.2(d^*)^2$$

and wherein the polymer has a $M_w/M_n$ of from 1.7 to 3.5. In a second particular aspect of this embodiment, the polymer has at least one melting point, $T_m$, in degrees Celsius and density, d*, in grams/cubic centimeter, wherein the numerical values of the variables correspond to the relationship:

$$T_m > -6288.1 + 13141(d^*) - 6720.3(d^*)^2.$$

In a third particular aspect of this embodiment, the polymer has at least one melting point, $T_m$, in degrees Celsius and density, d*, in grams/cubic centimeter, wherein the numerical values of the variables correspond to the relationship:

$$T_m \geq 858.91 - 1825.3(d^*) + 1112.8(d^*)^2.$$

In a fourth particular aspect of this embodiment, the polymer comprises in polymerized form ethylene and a $C_3$-$C_8$ α-olefin, said polymer having a delta quantity (tallest DSC peak minus tallest CRYSTAF peak) greater than the quantity, y*, defined by the equation:

$$y^* > -0.1299(\Delta H) + 62.81,$$

preferably the equation:

$$y^* > -0.1299(\Delta H) + 64.38,$$

and more preferably the equation:

$$y^* > -0.1299(\Delta H) + 65.95,$$

at a heat of fusion up to 130 J/g, wherein the CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak comprises at least 10 percent of the cumulative polymer. In a fifth particular aspect of this embodiment, the polymer has a tensile strength above 10 MPa, preferably a tensile strength ≧11 MPa, more preferably a tensile strength ≧13 MPa and an elongation at break of at least 600 percent, more preferably at least 700 percent, highly preferably at least 800 percent, and most highly preferably at least 900 percent at a crosshead separation rate of 11 cm/minute. In a sixth particular aspect of this embodiment, the polymer has a delta quantity (tallest DSC peak temperature (measured from the baseline) minus tallest CRYSTAF peak temperature (i.e., highest numerical value of dW/dT)) greater than 48° C. and a heat of fusion greater than or equal to 130 J/gm, wherein the CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C. More preferably, the highest CRYSTAF peak comprises at least 10 percent of the cumulative polymer. In a seventh particular aspect of this embodiment, the polymer has a storage modulus ratio, G'(25° C.)/G' (100° C.), of from 1 to 50, preferably from 1 to 20, more preferably from 1 to 10, and a 70° C. compression set of less than 80 percent, preferably less than 70 percent, especially less than 60 percent, down to a compression set of 0 percent. In an eighth particular aspect of this embodiment, the polymer has a heat of fusion of less than 85 J/g and a pellet blocking strength of equal to or less than 100 pounds/foot$^2$ (4800 MPa), preferably equal to or less than 50 lbs/ft$^2$ (2400 MPa), especially equal to or less than 5 lbs/ft$^2$ (240 Pa), and as low as 0 lbs/ft$^2$. In a ninth particular aspect of this embodiment, the polymer is an uncrosslinked, elastomeric interpolymer comprising in polymerized form at least 50 mole percent ethylene, having a 70° C. compression set of less than 80 percent, preferably less than 70 percent, most preferably less than 60 percent. In a tenth particular aspect of this embodiment, the polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random ethylene interpolymer fraction eluting between the same temperatures, wherein said comparable random ethylene interpolymer comprises the same comonomer(s), and has a melt index, density, and molar comonomer content (based on the whole polymer) within 10 percent of that of the blocked interpolymer. Preferably, the $M_w/M_n$ of the comparable interpolymer is also within 10 percent of that of the blocked interpolymer and/or the comparable interpolymer has a total comonomer content within 10 weight percent of that of the blocked interpolymer. Polymers of this embodiment preferably have an ethylene content of from 20 to 90 percent, a diene content of from 0.1 to 10 percent, and an α-olefin content of from 10 to 80 percent, based on the total weight of the polymer. Further preferably, the polymers of this embodiment have an ethylene content of from 60 to 90 percent, a diene content of from 0.1 to 10 percent, and an α-olefin content of from 10 to 40 percent, based on the total weight of the polymer. Even more preferably, the polymers of this embodiment have an ethylene content of from 65 to 75 percent, a diene content of from 0 to 6 percent, and an α-olefin content of from 20 to 35 percent. Preferred polymers are high molecular weight polymers, having a weight average molecular weight ($M_w$) of from 10,000 to 2,500,000, preferably from 20,000 to 500,000, more preferably from 20,000 to 350,000, and a polydispersity of less than 3.5, more preferably less than 3.0, and a Mooney viscosity (ML (1+4) 125° C.) of from 1 to 250. Polymers of this embodiment are further disclosed in PCT Publication No. WO2005/090427, the entire disclosure of which is hereby incorporated herein by reference. Particularly preferred polymers of this embodiment include the ethylene-octene multi-block copolymers given in Table 1 below.

TABLE 1

|  | Example No. | | | | | | | |
| --- | --- | --- | --- | --- | --- | --- | --- | --- |
|  | 1 | 2 | 3 | 4 | 5 | 6 | 7 | 8* |
| Hard Segment (wt %) | 0 | 12 | 31 | 61 | 71 | 84 | 100 | — |
| $I_2$ (g/10 min) | 1.2 | 1.7 | 1.4 | 1.0 | 1.1 | 1.0 | 4.9 | 1.0 |
| $M_w$ (kg/mol) | 129 | 112 | 124 | 108 | 100 | 102 | 76 | — |
| $M_w/M_n$ | 2.1 | 2.0 | 2.1 | 1.9 | 1.9 | 1.9 | 1.9 | — |
| Density, ρ (g/cm³) | 0.8582 | 0.8649 | 0.8795 | 0.9022 | 0.9097 | 0.9202 | 0.9419 | 0.8724 |
| Density, $X_c$ (wt %) | 3 | 8 | 19 | 36 | 41 | 49 | 64 | 14 |
| DMTA, $T_g$ (° C.) | −44 | −43 | −42 | −34 | −31 | −19 | — | — |
| $\Delta H_m$ (J/g) | 5 | 19 | 49 | 89 | 115 | 137 | 178 | 45 |
| DSC, $X_c$ (wt %) | 2 | 7 | 17 | 31 | 40 | 47 | 61 | 15 |
| X-ray, $X_c$ (wt %) | — | 6 | 19 | 35 | 41 | 50 | — | — |
| $\sigma_Y$ (MPa) | 00.9 | 01.2 | 02.5 | 07.3 | 10.4 | 13.7 | 23.4 | 02.2 |
| E at 5% (MPa) | 3 | 6 | 17 | 72 | 98 | 166 | 359 | 10 |
| Recovery from 300% Strain at 10 min (%) | 95 | 94 | 85 | 62 | 47 | 28 | 14 | 71 |

*Example No. 8 is a commercial elastomeric homogeneous ethylene-octene copolymer shown for comparative purposes.

Polymers having the properties given in Table 1 are further disclosed, for example, in the technical paper "Solid State Structure and Properties of Novel Olefin Block Copolymer," Hiltner, A., et al., first presented at ANTEC 2006, SPE's Annual Technical Conference, May 7-11, 2006, Charlotte, N.C. The publication is currently available at http://www.dow.com/PublishedLiterature/dh_057c/09002f138057c984.pdf?filepath=infuse/pdfs/noreg/788-00501.pdf&fromPage=GetDoc. The entire disclosure of this publication is hereby incorporated herein by reference.

The polymers of the invention may be oil extended with from 5 to about 75 percent, preferably from 10 to 60 percent, more preferably from 20 to 50 percent, based on total composition weight, of a processing oil. Suitable oils include any oil that is conventionally used in manufacturing extended EPDM rubber formulations. Examples include both naphthenic- and paraffinic-oils.

Rubber formulations of the present invention may be cured using conventional curing processes include, for example, peroxide curing, sulfur curing, radiation, and combinations thereof. Peroxide curing systems generally comprise an organic peroxide free radical initiator and optional coagent. Organic peroxides suitable as free radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Suitable coagents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the coagent is selected from zinc salts of acrylates, diacrylates, methacrylates, and dimethacrylates. In another particular embodiment, the coagent is zinc diacrylate. Sulfur and sulfur-based curing agents with optional accelerators may be used in combination with or in replacement of the peroxide initiators to crosslink the rubber. Suitable curing agents and accelerators include, for example, sulfur; N-oxydiethylene 2-benzothiazole sulfenamide; N,N-diortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof. High energy radiation sources capable of generating free radicals, such as electron beams, ultra-violet radiation, gamma radiation, X-ray radiation, infrared radiation, heat, and combinations thereof, may also be used to crosslink the rubber.

Additional components of the present formulations usefully employed according to the present invention include various other ingredients in amounts that do not detract from the properties of the resultant composition. These ingredients include, but are not limited to, activators such as calcium or magnesium oxide; fatty acids such as stearic acid and salts thereof; fillers and reinforcers such as calcium or magnesium carbonate, silica, and aluminum silicates; plasticizers such as dialkyl esters of dicarboxylic acids; antidegradants; softeners; waxes; and pigments.

Dispersions (both aqueous and non-aqueous) can be formed using the present polymers or formulations comprising the same. Frothed foams comprising the invented polymers can also be formed, as disclosed in PCT Publication No. 2004/027593. The polymers may also be crosslinked by any known means, such as the use of peroxide, electron beam, silane, azide, or other cross-linking technique. The polymers can also be chemically modified, such as by grafting (for example by the use of maleic anhydride (MAH), silanes, or other grafting agent), halogenation, amination, sulfonation, or other chemical modification.

Additives and adjuvants may be included in any formulation comprising the present polymers. Suitable additives include fillers, such as organic or inorganic particles, including clays, talc, carbon black, titanium dioxide, zeolites, powdered metals, organic or inorganic fibers, including carbon fibers, silicon nitride fibers, steel wire or mesh, and nylon or polyester cording, nano-sized particles, and so forth; tackifiers, oil extenders, including paraffinic or naphthelenic oils; and other natural and synthetic polymers, including other polymers according to the invention.

Suitable polymers for blending with the present polymers include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), conventional poly-4-methyl-1-pentene, various types of polyethylene, including high pressure, free-radical LDPE, Ziegler-Natta LLDPE, metallocene PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers for example polymers available under the trade designation VERSIFY® commercially available from The Dow Chemical Company and VISTAMAXX® commercially available from ExxonMobil Chemical Company can also be useful as components in blends comprising the present polymers.

Particularly desirable blends are thermoplastic polyolefin blends (TPO), thermoplastic elastomer blends (TPE), thermoplastic vulcanizates (TPV) and styrenic polymer blends. Polymers of the present invention (both rigid and flexible) produced via chain-shuttling polymerization can be used to produce TPVs which may have performance and processing characteristics comparable or superior to commercially available TPVs such as Santoprene®, commercially available from Advanced Elastomer Systems, and Sarlink®, commercially available from DSM Elastomers. TPE and TPV blends may be prepared by combining the present multi-block polymers, including functionalized or unsaturated derivatives thereof with an optional rubber, including conventional block copolymers, especially an SBS block copolymer, and optionally a crosslinking or vulcanizing agent. TPO blends are generally prepared by blending the present multi-block copolymers with a polyolefin, and optionally a crosslinking or vulcanizing agent.

The foregoing blends may be used in forming a molded object, and optionally crosslinking the resulting molded article. A similar procedure using different components has been previously disclosed in U.S. Pat. No. 6,797,779, the entire disclosure of which is hereby incorporated herein by reference.

Suitable conventional block copolymers for this application desirably possess a Mooney viscosity (ML 1+4@100° C.) in the range from 10 to 135, more preferably from 25 to 100, and most preferably from 30 to 80. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

In a particularly preferred embodiment, the present invention provides a blend composition comprising a multi-block copolymer and a non-ionomeric polymer. In a particular aspect of this embodiment, the multi-block copolymer is selected from ethylene-butene multi-block copolymers and ethylene-octene multi-block copolymers. The multi-block copolymer may be non-functionalized or functionalized, for example by maleic, fumaric, or itaconic anhydride grafting or acrylic, methacrylic, or epoxy acrylate grafting. In another particular aspect of this embodiment, the non-ionomeric polymer is selected from polyamides, polyurethanes, polyureas, polycarbonates, polyesters, polyacrylates, and engineering thermoplastics. In yet another particular aspect of this embodiment, the blend composition has one or more of the following properties: a Shore D hardness of from 30 to 80, a flexural modulus of from 10 to 100 kpsi, a neat sphere compression of from 30 to 100, and a coefficient of restitution of from 0.650 to 0.850. Particularly suitable blends of multi-block copolymers and non-ionomeric polymers are given in Table 2 below.

TABLE 2

| | Example No. | | | | | | | |
|---|---|---|---|---|---|---|---|---|
| | 1 | 2 | 3 | 4 | 5 | 6 | 7 | 8 |
| Rilsan ® AMNO (parts) | 50 | 50 | 50 | 50 | 50 | 50 | 50 | 50 |
| ethylene-butene multi-block copolymer (parts) | 10 | 20 | 30 | 0 | 0 | 0 | 0 | 0 |
| ethylene-octene multi-block copolymer (parts) | 0 | 0 | 0 | 30 | 0 | 0 | 0 | 0 |
| 0.5% maleic anhydride grafted ethylene-butene multi-block copolymer (parts) | 0 | 0 | 0 | 0 | 10 | 20 | 30 | 0 |
| 0.5% maleic anhydride grafted ethylene-octene multi-block copolymer (parts) | 0 | 0 | 0 | 0 | 0 | 0 | 0 | 30 |
| $TiO_2$ concentrate (phr) | 5 | 5 | 5 | 5 | 5 | 5 | 5 | 5 |

In another particularly preferred embodiment, multi-block copolymers of the present invention are used to produce unique hydrophobic and hybrid hydrophilic-hydrophobic block thermoplastic elastomers or thermoplastic vulcanizates with improved elastic recovery and/or higher heat resistance.

In yet another particularly preferred embodiment, the present invention provides a blend composition comprising a multi-block copolymer and at least one ionomeric material, such as acid polymers, partially neutralized acid polymers, and highly neutralized acid polymers. Suitable ionomeric materials are further disclosed, for example, in U.S. Patent Application No. 2005/0049367, the entire disclosure of which is hereby incorporated herein by reference. In a particular aspect of this embodiment, the multi-block copolymer is selected from ethylene-butene multi-block copolymers and ethylene-octene multi-block copolymers. The multi-block copolymer may be non-functionalized or functionalized, for example by maleic, fumaric, or itaconic anhydride grafting or acrylic, methacrylic, or epoxy acrylate grafting. In another particular aspect of this embodiment, the blend composition has one or more of the following properties: a Shore D hardness of from 30 to 70, a flexural modulus of from 10 to 80 kpsi, a neat sphere compression of from 30 to 100, and a coefficient of restitution of from 0.650 to 0.850. Particularly suitable blends of multi-block copolymers and ionomeric polymers are given in Table 3 below.

TABLE 3

| | Example No. | | | | | | | |
|---|---|---|---|---|---|---|---|---|
| | 1 | 2 | 3 | 4 | 5 | 6 | 7 | 8 |
| Surlyn ® 7940* (parts) | 50 | 50 | 50 | 50 | 50 | 50 | 50 | 50 |
| Surlyn ® 8945** (parts) | 40 | 30 | 20 | 20 | 40 | 30 | 20 | 20 |
| ethylene-butene multi-block copolymer (parts) | 10 | 20 | 30 | 0 | 0 | 0 | 0 | 0 |
| ethylene-octene multi-block copolymer (parts) | 0 | 0 | 0 | 30 | 0 | 0 | 0 | 0 |
| 0.5% maleic anhydride grafted ethylene-butene multi-block copolymer (parts) | 0 | 0 | 0 | 0 | 10 | 20 | 30 | 0 |
| 0.5% maleic anhydride grafted ethylene-octene multi-block copolymer (parts) | 0 | 0 | 0 | 0 | 0 | 0 | 0 | 30 |
| TiO$_2$ concentrate (phr) | 5 | 5 | 5 | 5 | 5 | 5 | 5 | 5 |

*Surlyn ® 7940 is an ethylene/methacrylic acid copolymer partially neutralized with a lithium-based cation source, and is commercially available from E. I. du Pont de Nemours and Company.
**Surlyn ® 8945 is an acid copolymer highly neutralized with a sodium-based cation source, and is commercially available from E. I. du Pont de Nemours and Company.

The blends may be prepared by mixing or kneading the respective components at a temperature around or above the melt point temperature of one or both of the components. For most multi-block copolymers, this temperature may be above 130° C., most generally above 145° C., and most preferably above 150° C. Typical polymer mixing or kneading equipment may be employed, for example, mills, kneaders, extruders (both single and twin-screw), Banbury mixers, calenders, and the like. The sequence of mixing and method may depend on the final composition. A combination of Banbury batch mixers and continuous mixers may also be employed, such as a Banbury mixer followed by a mill mixer followed by an extruder. Typically, a TPE or TPV composition will have a higher loading of cross-linkable polymer (typically the conventional block copolymer containing unsaturation) compared to TPO compositions. Generally, for TPE and TPV compositions, the weight ratio of block copolymer to multi-block copolymer may be from about 90:10 to 10:90, more preferably from 80:20 to 20:80, and most preferably from 75:25 to 25:75. For TPO applications, the weight ratio of multi-block copolymer to polyolefin may be from about 49:51 to about 5:95, more preferably from 35:65 to about 10:90. For modified styrenic polymer applications, the weight ratio of multi-block copolymer to polymer may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend.

The blend compositions may contain processing oils, plasticizers, and processing aids. Rubber processing oils have a certain ASTM designations and paraffinic, naphthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly) glycol esters, and metal salt-, especially Group 1 and 2 metal or zinc-, salt derivatives thereof.

Compositions, including thermoplastic blends according to the present invention may also contain anti-ozonants or anti-oxidants that are known to those of ordinary skill in the rubber chemistry art. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic antioxidants, hydroquinone derivatives, quinoline, diphenylene antioxidants, thioester antioxidants, and blends thereof. Some representative trade names of such products are Wingstay® S antioxidant, Polystay® 100 antioxidant, Polystay® 100 AZ antioxidant, Polystay® 200 antioxidant, Wingstay® L antioxidant, Wingstay® LHLS antioxidant, Wingstay® K antioxidant, Wingstay® 29 antioxidant, Wingstay® SN-1 antioxidant, and Irganox® antioxidants. In some applications, the anti-oxidants and anti-ozonants used will preferably be non-staining and non-migratory.

For providing additional stability against UV radiation, hindered amine light stabilizers (HALS) and UV absorbers may also be used. Suitable examples include Tinuvin® 123, Tinuvin® 144, Tinuvin® 622, Tinuvin® 765, Tinuvin® 770, and Tinuvin® 780, commercially available from Ciba Specialty Chemicals, and Chemisorb® T944, available from Cytex Plastics. A Lewis acid may be additionally included with a HALS compound in order to achieve superior surface quality, as disclosed in U.S. Pat. No. 6,051,681.

For some compositions, additional mixing processes may be employed to pre-disperse the anti-oxidants, anti-ozonants, UV absorbers, and/or light stabilizers to form a masterbatch, and subsequently to form polymer blends therefrom.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729, the entire disclosures of which are hereby incorporated herein by reference.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5, phr, based on the total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIL), among others. Use of peroxide crosslinkers and optional coagents used for partial or complete dynamic vulcanization are known in the art and disclosed for example in the publication, "Peroxide Vulcanization of Elastomer," Vol. 74, No. 3, July-August 2001.

When the multi-block copolymer containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to the invention, the percent gel content is desirably in the range from 5 to 100 percent.

Thermoplastic compositions according to the invention may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titanias. Silane based or other coupling agents may also be employed for better filler bonding.

The thermoplastic compositions of this invention, including the foregoing blends, may be processed by conventional molding techniques such as injection molding, extrusion molding, thermoforming, slush molding, over molding, insert molding, blow molding, and other techniques.

Suitable polymer products and methods for their manufacture are further described in PCT Publication Nos. WO2005/090425, WO2005/090426, and WO2005/090427, the entire disclosures of which are hereby incorporated herein by reference.

Golf Ball Applications

Polymer compositions according to the present invention can be used in a variety of applications. For example, the polymer compositions are suitable for use in golf equipment, including, but not limited to, golf balls, shoes, clubs, and gloves.

In golf balls of the present invention, at least one layer comprises a multi-block copolymer which is prepared in the presence of a chain shuttling agent as described herein. In a particular embodiment, the polymer is prepared in the presence of a chain shuttling agent as disclosed in PCT Publication No. WO2005/090425, the entire disclosure of which is hereby incorporated herein by reference. In another particular embodiment, the polymer is prepared in the presence of a chain shuttling agent as disclosed in PCT Publication No. WO2005/090426, the entire disclosure of which is hereby incorporated herein by reference. In yet another particular embodiment, the polymer is prepared in the presence of a chain shuttling agent as disclosed in PCT Publication No. WO2005/090427, the entire disclosure of which is hereby incorporated herein by reference.

Compositions of the present invention can be either foamed or filled with density adjusting materials to provide golf balls having modified moments of inertia.

Golf balls of the present invention can be wound, one-piece, two-piece, or multi-layer balls, so long as at least one layer comprises a multi-block copolymer prepared by a process using a chain shuttling agent as disclosed herein. In golf balls having two or more layers which comprise a multi-block copolymer, the multi-block copolymer of one layer may be the same or a different multi-block copolymer as another layer. The layer(s) comprising the multi-block copolymer can be any one or more of a core layer, an intermediate layer, or a cover layer.

In a particular embodiment, the invention provides a golf ball comprising a core having a diameter of from 1.50 inches to 1.62 inches and a cover having a thickness of from 0.03 inches to 0.19 inches. In a particular aspect of this embodiment, the core is formed from a composition comprising a multi-block copolymer produced in the presence of a chain shuttling agent. In another particular aspect of this embodiment, the cover is formed from a composition comprising a multi-block copolymer produced in the presence of a chain shuttling agent.

In another particular embodiment, the invention provides a golf ball comprising a core having a diameter of from 1.30 inches to 1.62 inches, a cover having a thickness of from 0.02 inches to 0.04 inches, and a casing layer disposed between the core and the cover and having a thickness of from 0.03 inches to 0.06 inches. In a particular aspect of this embodiment, the core is formed from a composition comprising a multi-block copolymer produced in the presence of a chain shuttling agent. In another particular aspect of this embodiment, the cover is formed from a composition comprising a multi-block copolymer produced in the presence of a chain shuttling agent. In yet another particular aspect of this embodiment, the casing layer is formed from a composition comprising a multi-block copolymer produced in the presence of a chain shuttling agent.

In another particular embodiment, the invention provides a golf ball comprising an inner core, an outer core, a cover, and a casing layer disposed between the outer core and the cover. The inner core preferably has a diameter of from 0.50 inches to 1.30 inches. The outer core preferably has a thickness of from 0.12 inches to 0.55 inches. The casing layer preferably has a thickness of from 0.03 inches to 0.06 inches. The cover preferably has a thickness of from 0.02 inches to 0.04 inches. At least one of the inner core, outer core, cover, and casing layer is formed from a composition comprising a multi-block copolymer produced in the presence of a chain shuttling agent.

In yet another particular embodiment, the invention provides a multi-layer ball having a compression molded rubber core, one or more injection or compression molded intermediate layer(s), and a polyurethane or polyurea outer cover layer, wherein at least one of the intermediate layer(s) is formed from a composition comprising a multi-block copolymer produced in the presence of a chain shuttling agent. The polyurethane or polyurea outer cover layer material can be thermoset or thermoplastic. Thermoset materials can be formed into golf ball layers by conventional casting or reaction injection molding techniques. Thermoplastic materials can be formed into golf ball layers by conventional compression or injection molding techniques. Light stable polyureas and polyurethanes are preferred for outer cover layer materials. Preferably, the rubber core composition comprises a base rubber, a crosslinking agent, a filler, a co-crosslinking or initiator agent, and a cis to trans converting material (e.g., organosulfur and inorganic sulfur compounds). Typical base rubber materials include natural and synthetic rubbers, including, but not limited to, polybutadiene and styrene-butadiene. The crosslinking agent typically includes a metal salt, such as a zinc salt or magnesium salt, of an acid having from 3 to 8 carbon atoms, such as (meth) acrylic acid. The initiator agent can be any known polymerization initiator which decomposes during the cure cycle, including, but not limited to, dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy) hexane or di-t-butyl peroxide, and mixtures thereof. Suitable types and amounts of base rubber, crosslinking agent, filler, co-crosslinking agent, and initiator agent are more fully described in, for example, U.S. Patent Application Publication No. 2003/0144087, the entire disclosure of which is hereby incorporated herein by reference. Reference is also made to U.S. Patent Application Publication No. 2003/0144087 for various ball constructions and materials that can be used in golf ball core, intermediate, and cover layers.

The present invention is not limited by any particular process for forming the golf ball layer(s). It should be understood that the layer(s) can be formed by any suitable technique, including injection molding, compression molding, casting, and reaction injection molding.

Golf balls of the present invention preferably have a coefficient of restitution ("COR") of at least 0.790, more preferably at least 0.800, even more preferably at least 0.805, and most preferably at least 0.810, and a compression of from 75 to 110, preferably from 90 to 100.

For purposes of the present invention, compression is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

For purposes of the present invention, COR is determined according to a known procedure wherein a golf ball or golf ball subassembly (e.g., a golf ball core) is fired from an air cannon at a given velocity (125 ft/s for purposes of the present invention). Ballistic light screens are located between the air cannon and the steel plate to measure ball velocity. As the ball travels toward the steel plate, it activates each light screen, and the time at each light screen is measured. This provides an incoming transit time period inversely proportional to the ball's incoming velocity. The ball impacts the steel plate and rebounds though the light screens, which again measure the time period required to transit between the light screens. This provides an outgoing transit time period inversely proportional to the ball's outgoing velocity. COR is then calculated as the ratio of the incoming transit time period to the outgoing transit time period, $COR=T_{in}/T_{out}$.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising:
    a core having an overall diameter of from 1.30 inches to 1.62 inches and comprising an inner core and an optional outer core;
    a cover having a thickness of from 0.02 inches to 0.04 inches; and
    a casing layer disposed between the core and the cover and having a thickness of from 0.03 inches to 0.06 inches;
    wherein the casing layer is formed from a composition comprising a multi-block copolymer, and wherein the multi-block copolymer is produced by a process comprising contacting ethylene under addition polymerization conditions with a catalyst composition, the catalyst composition comprising the admixture or reaction product resulting from combining:
    (A) a first olefin polymerization catalyst,
    (B) a second olefin polymerization catalyst capable of preparing polymers differing in chemical or physical properties from the polymer prepared by the first olefin polymerization catalyst under equivalent polymerization conditions, and
    (C) a chain shuttling agent,
    wherein at least one of the first olefin polymerization catalyst or the second olefin polymerization catalyst is capable of forming a branched polymer by means of chain walking or reincorporation of in situ formed olefinic polymer chains.

2. The golf ball of claim 1, wherein the composition is a blend comprising the multi-block copolymer and a non-ionomeric polymer selected from the group consisting of polyamides, polyurethanes, polyureas, polycarbonates, polyesters, polyacrylates, and engineering thermoplastics.

3. The golf ball of claim 2, wherein the non-ionomeric polymer is a polyamide.

4. The golf ball of claim 1, wherein the composition is a blend comprising the multi-block copolymer and an additional polymer selected from acid polymers, partially neutralized acid polymers, and highly neutralized acid polymers.

5. The golf ball of claim 4, wherein the additional polymer is a partially or highly neutralized acid polymer and wherein the blend has a Shore D hardness of from 30 to 80, a flexural modulus of from 10 to 100 kpsi, a neat sphere compression of from 30 to 100, and a coefficient of restitution of from 0.650 to 0.850.

6. A golf ball comprising:
    a core having an overall diameter of from 1.30 inches to 1.62 inches and comprising an inner core and an optional outer core;
    a cover having a thickness of from 0.02 inches to 0.04 inches; and
    a casing layer disposed between the core and the cover and having a thickness of from 0.03 inches to 0.06 inches;
    wherein the casing layer is formed from a composition comprising a multi-block copolymer, and wherein the multi-block copolymer is produced by a process comprising contacting a first monomer selected from the group consisting of propylene and 4-methyl-1-pentene, and one or more addition polymerizable comonomers other than the first monomer, under addition polymerization conditions with a catalyst composition, the catalyst composition comprising the admixture or reaction product resulting from combining:
- (A) a first olefin polymerization catalyst,
- (B) a second olefin polymerization catalyst capable of preparing polymers differing in chemical or physical properties from the polymer prepared by the first olefin polymerization catalyst under equivalent polymerization conditions, and
- (C) a chain shuttling agent.

7. The golf ball of claim 6, wherein the composition is a blend comprising the multi-block copolymer and a non-ionomeric polymer selected from the group consisting of polyamides, polyurethanes, polyureas, polycarbonates, polyesters, polyacrylates, and engineering thermoplastics.

8. The golf ball of claim 7, wherein the non-ionomeric polymer is a polyamide.

9. The golf ball of claim 6, wherein the composition is a blend comprising the multi-block copolymer and an additional polymer selected from acid polymers, partially neutralized acid polymers, and highly neutralized acid polymers.

10. The golf ball of claim 9, wherein the additional polymer is a partially or highly neutralized acid polymer and wherein the blend has a Shore D hardness of from 30 to 80, a flexural modulus of from 10 to 100 kpsi, a neat sphere compression of from 30 to 100, and a coefficient of restitution of from 0.650 to 0.850.

11. A golf ball comprising:
- a core having an overall diameter of from 1.30 inches to 1.62 inches and comprising an inner core and an optional outer core;
- a cover having a thickness of from 0.02 inches to 0.04 inches; and
- a casing layer disposed between the core and the cover and having a thickness of from 0.03 inches to 0.06 inches;

wherein the casing layer is formed from a composition comprising a multi-block copolymer selected from the group consisting of maleic anhydride grafted ethylene-butene multi-block copolymers and maleic anhydride grafted ethylene-octene multi-block copolymers, and wherein the multi-block copolymer is produced by a process comprising contacting one or more addition polymerizable monomers under addition polymerization conditions with a catalyst composition, the catalyst composition comprising the admixture or reaction product resulting from combining:
- (A) a first olefin polymerization catalyst,
- (B) a second olefin polymerization catalyst capable of preparing polymers differing in chemical or physical properties from the polymer prepared by the first olefin polymerization catalyst under equivalent polymerization conditions, and
- (C) a chain shuttling agent.

12. The golf ball of claim 11, wherein the composition is a blend comprising the multi-block copolymer and a non-ionomeric polymer selected from the group consisting of polyamides, polyurethanes, polyureas, polycarbonates, polyesters, polyacrylates, and engineering thermoplastics.

13. The golf ball of claim 12, wherein the non-ionomeric polymer is a polyamide.

14. The golf ball of claim 11, wherein the composition is a blend comprising the multi-block copolymer and an additional polymer selected from acid polymers, partially neutralized acid polymers, and highly neutralized polymers.

15. The golf ball of claim 14, wherein the additional polymer is a partially or highly neutralized acid polymer and wherein the blend has a Shore D hardness of from 30 to 80, a flexural modulus of from 10 to 100 kpsi, a neat sphere compression of from 30 to 100, and a coefficient of restitution of from 0.650 to 0.850.

* * * * *